Dec. 23, 1958 F. G. STEELE 2,866,177

COMPUTER READ-OUT SYSTEM

Filed Jan. 9, 1953 4 Sheets-Sheet 1

INVENTOR:
Floyd G. Steele
BY
Walter J. Jason
ATTORNEY

COMPUTER READ-OUT SYSTEM

Filed Jan. 9, 1953 4 Sheets-Sheet 2

INVENTOR:
Floyd G. Steele
BY
[signature]
ATTORNEY

INVENTOR:
Floyd G. Steele
BY
Walter J. Jason
ATTORNEY

Dec. 23, 1958 F. G. STEELE 2,866,177

COMPUTER READ-OUT SYSTEM

Filed Jan. 9, 1953 4 Sheets-Sheet 4

INVENTOR:
Floyd G. Steele
BY
ATTORNEY

United States Patent Office 2,866,177

Patented Dec. 23, 1958

2,866,177

COMPUTER READ-OUT SYSTEM

Floyd G. Steele, La Jolla, Calif., assignor to Digital Control Systems, Inc., a corporation of California

Application January 9, 1953, Serial No. 330,429

35 Claims. (Cl. 340—174)

The present invention relates to a computer read-out system and, more particularly, to a system for simultaneously producing in visual form a series of characters represented by the values of a series of binary numbers appearing on the magnetic memory drum of a digital computer.

Modern electronic binary computers, as generally conceived, receive input data in binary number form, operate on such data by performing complex and interrelated addition, subtraction, division and multiplication operations on the binary number information, and finally produce output or answer information still in binary number form. In order to most effectively utilize the output information of such computers, it is generally most desirable to convert such binary number information into the more convenient decimal form as generally used in representing numerical information. Such output conversion devices may take many forms, card punching mechanisms, tape punching mechanisms, high speed printers, and the like. In general, each of these output conversion devices is separate and distinct from its associated computer and operates only on the output signal of the computer to produce the desired conversion thereof. This complete separation between the computer and its corresponding read-out device in the past has led to considerably more complexity in both than is actually required.

The present application discloses certain subject matter which is common with that disclosed in the co-pending U. S. application for patent, Serial No. 260,807, now abandoned, filed December 10, 1951, and entitled "Computer Read-Out Devices" and also with that disclosed in the co-pending U. S. application for patent, Serial No. 260,808, now abandoned, filed December 10, 1951, and entitled "Computers." Accordingly, the present application is a continuation-in-part of these two co-pending applications as to common subject matter. In particular, the present invention contemplates a computer read-out system having particular applicability to existing computer systems utilizing magnetic storage drums as their principal memory device. In operation and structure, the present read-out system is so integrated with the magnetic storage drum as to, for all practical purposes, be included as a portion of the computer's memory component and hence, provide a great simplification over prior art read-out devices which, as stated above, are generally independent of their associated computers.

In particular, the preferred embodiment of the present invention operates in conjunction with a recirculating information channel on a magnetic drum included within, for example, an electronic desk calculator, an adding machine, or the like, on which is recorded two sets of interplexed binary numbers. Each set of numbers contains eight individual binary numbers, each of the numbers comprising four consecutive place binary digits. As will become clear in the present application, first the individual numbers of the first set are read out in order and then in a continuation of the same machine operations the individual numbers of the second set are read out, the first and second number sets being in operation read out alternately without any change or variation in the machine processes which effect this read out. Since no changes in machine operation occur in changing from read-out of the first number set to read-out of the second number set, in the present application only read-out of the first number set is described in detail.

Associated with this information channel is a shifting register circuit of four stages, it being capable of completely retaining one of the binary numbers. The length of the information channel is less than half of the circumference of the drum by an amount equal to the channel length required to record any one of the binary numbers. This unrecorded binary number is, in turn, stored in the register circuit.

In operation, during, for example, the first designated revolution of the memory drum, the first binary number of the first set is isolated in the register while the remaining information, during its recirculation, precesses relative to itself owing to the length of the information channel. During the time of this recirculation, sixteen successive subtractions are performed on the isolated number with two things being simultaneously accomplished thereby. First of all, at the conclusion of the subtractions, the value of the number in the register is the same as it was initially and hence may be reinserted in the channel without change of value. Secondly, upon a particular one of such subtractions, depending on the initial value of the isolated number, there will remain at the conclusion thereof a carry digit value of one denoting that the binary value of 0000 has been changed to 1111. The point at which this single carry digit occurs is determined by the number of the subtractions performed on the binary number and this number of subtractions, in turn, indicates the initial value of the number.

Now for read-out purposes, there is attached to the memory drum a pair of deflection disks each having sixteen contoured portions or segments around its periphery, the segments on the two disks being paired for the purposes of providing horizontal and vertical deflection patterns for a cathode ray tube. Each contoured segment pair on the deflection disks, in turn, corresponds to a binary number value as determined by the successive subtractions required to produce the above noted carry digit. These segment contour pairs are continuously converted into corresponding electrical signals which are applied in a conventional manner to the horizontal and vertical deflection plates of the cathode ray tube whose electron beam is normally blanked.

Now, when the value of the number, indicated by the carry digit remaining after the subtraction, appears, the electron beam of the cathode ray tube is unblanked and the segment contours of the disk pair then being electrically presented to the tube appears as a visible character on the screen face thereof. A correlation is, of course, maintained between each subtraction and the corresponding value the isolated number would have if a carry were produced, as well as the visual image that the number's value represents.

The precession of the number sets on the information channel is such that with, for example, the first number of the first set isolated in the register for one revolution, at the end of that revolution, the second number in the first set will then appear at the entrance to the register. Upon such an occurrence, this first number in the register is then brought back into the memory loop and the second number of the first set isolated in the register for the next full recirculation. Then, with the process repeating, the second, third, fourth, etc., numbers of the first set are each successively isolated in the register, each isolation being for one drum revolution.

In the continuation of the described process, at the end of the drum revolution in which the eighth or last number of the first set has been isolated in the register, the first number of the second number set will then appear at the entrance to the register, and thus for the next eight drum revolutions the eight numbers of the second number set will be successively isolated in the register. In overall operation therefore the first and second number sets may be alternately read out through the register, each read-out requiring eight drum revolutions. As hereinbefore stated, since no change in operation is required, only read-out of the first number set will be described in detail.

The binary numbers of the first number set appear consecutively in the stepping register, each for one drum revolution, and each number is accordingly identified by a trace on the screen of the cathode ray tube. In order to prevent the consecutive tracings from overlapping each other on the screen, a stepped deflection potential is applied to one of the horizontal plates of the tube such that each number thus identified will be traced on a separate portion of the screen. This stepped deflection potential is continuously recycled every eight drum revolutions so that the tracings of the eight binary numbers constituting the first number set and the tracings of the corresponding eight binary numbers of the second number set will continually fall on their own respective screen spaces. Thus, if the associated computer were a desk calculator or adding machine, then the answers, including Arabic numerals, signs, decimal points, etc., would alternately appear on the screen as visual images.

As a different embodiment of the present invention, there is illustrated a high speed printing mechanism instead of a cathode ray tube which is actuated to reproduce, by printing, the values represented by the consecutive binary numbers of the first and second sets. Additionally, there is set forth the relationship required between the length of each binary number, the length of the information channel relative to the overall circumference of the memory drum, and the length of the stepping register, as they mutually relate to the precessing of the information recirculating on the drum and the isolation of specific information in the register.

It is, therefore, the principal object of the present invention to provide a device for visually representing the output number value appearing in a recirculating channel on the magnetic memory drum of a digital computer.

Another object of the present invention is to provide a device for isolating portions of binary information recirculating through a cyclical storage device and identifying the value of each portion thus isolated.

Another object of the present invention is to provide a device for selectively isolating in a stepping register predetermined groupings of information normally recirculating on the information channel of the magnetic memory drum.

Another object of the present invention is to provide a device for selectively routing binary information scanned from an information channel of a magnetic memory drum either through a stepping register or directly back to the channel, the latter thereby isolating a portion of the information in the register.

A still further object of the present invention is to provide a device for isolating in a stepping register every other binary number of a series of binary numbers recorded serially and recirculating around an information track of a magnetic memory drum and identifying each number during its isolation.

Still another object of the present invention is to provide a device for consecutively isolating the binary numbers of a first set of numbers found interplexed with a second binary number set on a recirculating information channel of a magnetic memory drum and identifying each number while isolated.

A further object of the present invention is to provide a device for use with an information channel on a magnetic drum, the channel having two sets of binary numbers recorded in an interplexed form thereon, the device consecutively isolating the progressive binary numbers of one set in a stepping register, each isolation being for one drum revolution, and identifying the values of each first set number during its isolation period.

A still further object of the present invention is to provide a device for consecutively isolating the binary numbers of a first set of numbers found interplexed with a second binary number set on a recirculating information channel of a magnetic memory drum, each isolation being for one turn of the drum, successively subtracting during the isolation binary one values from the number until the original value reappears, and producing an output signal following the subtraction operation which produces a predetermined remainder in the register, the appearance of the output signal relative to the number of subtractions indicating the original value of the isolated number.

A still further object of the present invention is to provide a device for consecutively isolating the binary numbers of a first set of numbers found interplexed with a second set of binary numbers on a recirculating information channel of a magnetic memory drum, each isolation being for one turn of the drum, successively subtracting during each isolation period binary one values from the number until the original value reappears, applying for each subtraction a different deflection pattern to a blanked cathode ray tube, and unblanking the tube following the subtraction operation which produces a predetermined remainder in the register, the trace appearing on the cathode ray tube screen during the unblanked time representing the original value of the isolated number.

A still further object of the present invention is to provide a device for consecutively isolating the binary numbers of a first set of numbers found interplexed with a second set of binary numbers on the information channel of a magnetic memory drum, each isolation being for one turn of the drum, successively identifying the values of the first set of the binary numbers during the consecutive isolations, and printing a character represented by the value of each identified binary number.

Other objects and features of the present invention will be readily apparent to those skilled in the art from the following specification and appended drawings wherein is illustrated a preferred form of the invention, and in which.

Figure 1:
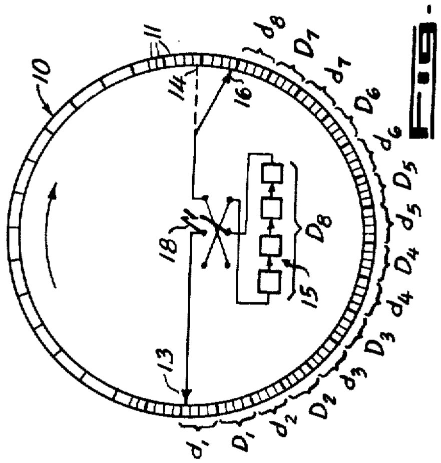
Fig. 1 is a schematic presentation of a memory drum and stepping register.

Referring now to Fig. 1, there is illustrated in diagrammatic form, a recirculating information track as it appears on a rotating magnetic memory drum with particular reference toward digital computer systems. Before considering the designated groupings of the numerical information thereon, it is desirable to first consider certain basic principles applicable to magnetic data storage as understood in the present state of the art. Generally speaking, the memory drum is preferably constructed of plastic or other non-magnetic materials exteriorly coated with a magnetizable iron oxide, such as the red gamma iron oxide variety, $Fe_2O_3$. Around one given circumferential band or line is permanently recorded an endlessly repetitive magnetic waveform which, when scanned or sensed by a magnetic head, termed "read" head, over-lying the track in close proximity thereto, produces a corresponding repetitive electrical output signal waveform. Such a waveform may be of a sine wave configuration, square wave configuration, or comprise equally spaced pulses as determined by the initial magnetic pattern.

The output signal of such a "read" head is amplified and is usually applied to an electronic switching device, for example, a bi-stable multivibrator circuit, commonly termed flip-flop, the output signal of which being used by the associated computer system for synchronizing all of the gating, stepping, etc., operations performed therein. Such a signal is generally termed a timing or clocking signal and, as here contemplated, comprises alternate low and high voltage levels, all of which may be of substantially the same time duration, each adjacent low and high voltage level marking or indicating a time division hereafter referred to as a timing interval.

Also included in such a memory system, is a pair of "read" and "write" heads, placed adjacent another circumferential band or track around the drum, the heads serving to endlessly recirculate computational information stored between their points of coupling to the iron coating. In particular, the "write" head is utilized to record or write bits of digital data on the track with the "read" head serving to read or extract the bits of information thus recorded by the "write" head.

Binary computer systems utilize information expressed in the binary number form and each digit, as such, may be represented by either of two distinguishing characteristics or marks, as the case may be, depending on whether the particular particle of information is of 0 or 1 binary value. When such digit values appear as the conduction states of electronic switches, for example, flip-flops, they are represented by either high or low output voltage levels thereof, while on a magnetic memory track appear as directions of magnetization of the iron coating. Thus, a binary digit value of 1 may be represented magnetically by an orientation of the track's magnetic particles in one direction relative to the track's movement while the binary digit value of 0 will be represented by an opposite alignment of the component track particles.

By properly correlating the output voltage levels of flip-flops with the magnetizing properties of "write" heads, it is possible to transform the two voltage levels into the two directions of magnetization. Also, by applying a "read" head's output signals properly to a flip-flop, the states of magnetization of the drum may be transformed into corresponding voltage levels representing the same digit values. Thus, by suitably combining the operational properties of "read" and "write" heads, magnetic channels, and flip-flop conduction states, it is possible to transform voltage levels into magnetic states, delay the magnetic states for a period of time corresponding to the time of the drum's rotation between the "write" and "read" points, sense the delayed magnetic states by a "read" head, and finally convert the "read" head's output signals back into a voltage level form representing exactly the initially recorded digit values, for reapplication to the "write" head. This recirculation of binary information comprises one of the most fundamental and basic concepts in the employment of magnetic memory systems with digital computers.

The timing information channel is of considerable importance and use in the recirculation of the information and in the computational manipulations performed on the binary information by the associated computer system as it proceeds between the "read" and "write" heads. This is true since the clocking signal provides a measure of, in respect to time, the duration of each single numerical informational bit either as it exists as the conduction state of a given flip-flop or in the "write" head as it is transformed into a magnetic state. Thus, considering the data recorded on the information channel, each binary digit thereon is represented by the magnetic alignment of the iron over a arcuate distance equal to the travel of the drum as it rotates for the time contained in one clocking interval. Thus, by permanently recording this timing information on one channel and then endlessly employing it for controlling the recording of all binary data on the information channel, it is possible to accurately allot consecutive divisions or spaces of the information channel to the consecutive digits as they appear either new from the computer system or as recirculated data from the "read" head. Also, each creation of a new binary value, in a computational operation, is synchronously controlled by the clocking information so that it may readily be recorded in a separate space on the information channel with all other information bits without the requirement of special time delays, etc.

Returning now to the diagrammatic presentation of Fig. 1, there is indicated generally at 10 an information track comprising a series of spaces or divisions 11. Each of spaces 11 represents the distance traveled by the track, owing to the drum rotation, during a single timing interval measured by a clocking signal generated, in turn, from a timing channel not herein specifically illustrated. A "read" point is illustrated generally at 13, wherein is reproduced in voltage level form, the digit values magnetically appearing in the individual spaces to the counterclockwise direction thereof upon the subsequent rotational movement of channel 10.

If now, the series of digit values found in the spaces passing point 13 are removed therefrom and re-recorded substantially 180° around the wheel therefrom at the point indicated at 14, then a simple recirculation of the information will be produced. As should be here noted, the total information contained in the designated digit spaces will make two complete excursions for each single revolution of channel 10, it being only one-half the length thereof. If now, one of the information digits or bits were to be delayed one timing interval in traveling between points 13 and 14, it would be recorded one space behind its normal re-record position owing to the delay afforded it. This could be prevented by moving record point 14 clockwise one space width with the result that the delayed digit would be recorded in its usual spot relative to the other recorded information. In the same way, if each bit coming from point 13 were to be delayed four timing intervals, then by moving point 14 four spaces in the clockwise direction, as at point 16, then a continuous recirculation of information would be produced again without disarranging the initial relationship of the individual digit values.

A stepping register is generally indicated at 15, it comprising four serial stages and being interconnected between "read" point 13 and "record" point 16 by a switch 18. Considering now the pattern or arrangement of the binary values on the information channel, there is found two sets of binary numbers, the consecutive individual numbers of the two sets being arranged in an interlaced or interplexed manner relative to each other. Thus, the consecutive binary numbers of one set, designated by $d_1$, $d_2$, $d_3$, . . . , $d_8$ are found interlaced with the consecutive numbers of the other set, here being designated by $D_1$, $D_2$, $D_3$, . . . , $D_8$. Each number of both sets, in turn, is composed of four consecutive place binary digits, the least significant digit of which first passes under the "read" point. The values of the $d_1$ through $d_8$ and the $D_1$ through $D_8$ binary numbers may represent Arabic digits, as well as other information components, such as punctuation marks, letters, etc.

Considering now switch 18 for the moment, if the movable switch arm thereof is thrown to its left-hand contact position, as viewed from Fig. 1, it is seen that the digit values appearing at point 13 will step serially, bit by bit, through register 15 and from there to point 16 with their subsequent replacement on the channel. However, if switch 18 is thrown to engage its right-hand contact position, as may be seen by tracing the circuit, register 15 will be isolated from the magnetic memory with the result that each bit of information appearing at point 13 will be directly deposited at point 16. In this case, if the switching operation is performed at the instant the four stages of register 15 contain completely the binary values of one binary number, this number is accordingly isolated and may be used for read-out purposes as is herein afterwards illustrated, or may be, as will also be evident, combined in an additive or other mathematical manner with other digits as they appear for recirculation at point 13.

Considering further switch 18, if, for example, the binary digits comprising number $d_1$ were to be isloated by a proper switching operation in register 15 for one complete revolution of the memory wheel, the remaining information would make two complete excursions. Since deposit point 16 is four spaces shorter than 180° from "read" point 13, each complete excursion of the information in the channel will precess by four spaces, that is, where $d_1$, for example, might appear at point 13 at a particular time and then be immediately afterwards isolated in the register for identifying or read-out purposes. Exactly half a drum revolution later, $D_1$ would appear at point 13 and after a full revolution were made by the drum, two of such precessions would occur and number $d_2$ would appear at point 13 and at that time may, if desired, be combined digit by digit with $d_1$, then appearing in register 15.

Furthermore, at that time, switch 18 could be thrown again to its left position with the $d_1$ contents of the register being brought back into the long memory loop and the individual bits of $d_2$ stepped serially into the register. Then, with the register filled by the $d_2$ number, switch 18 could again be thrown to its right-hand position with the precession of the memory information again taking place. Then, as formerly, the value of $d_2$ could be sampled for read-out purposes or could, after one complete revolution of the drum, be available for addition, or subtraction, etc., with the then appearing $d_3$ number at point 13.

Figure 2:
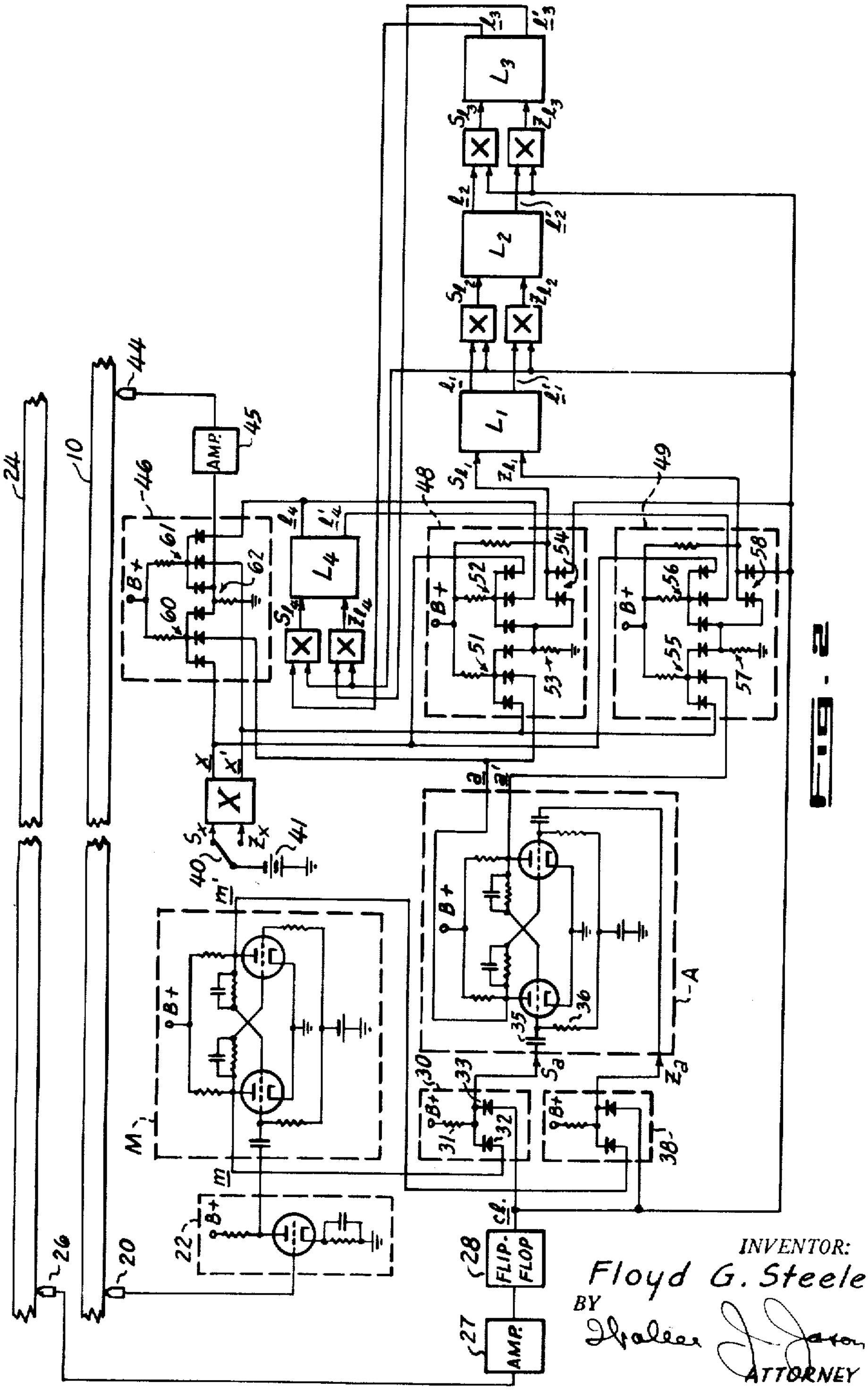
Fig. 2 is a circuit diagram of an electronic embodiment of the schematic presentation of Fig. 1.

Referring now to Fig. 2, there is illustrated a complete electronic embodiment of the diagrammatic presentation of Fig. 1 in which switch 18 is shown as an electronic embodiment capable of producing the results therein set forth. Information channel 10 is again illustrated, but here, for convenience, is shown in a longitudinally expanded form. A "read" head 20 is positioned adjacent track 10 and electrically responds to the changes of the magnetic flux pattern on channel 10 by producing pulses of alternate positive and negative polarity. These pulses are applied to the input terminal of an amplifier 22, of conventional type, the amplified output signal of which is applied as an input signal to an electronic switch such as flip-flop M, herein utilized for the purposes of synchronizing the information read by head 20 with the clocking information signal. The amplified signal from amplifier 22 comprises alternate positive and negative pulses which act to trigger flip-flop M into alternate conduction states corresponding to the binary values passing beneath head 20.

In particular, flip-flop M produces a pair of complementary output signals $m$ and $m'$ appearing on a pair of output conductors. By complementary is meant that when signal $m$ is at a high voltage level, signal $m'$ will be at a corresponding low voltage level and, alternately, when signal $m$ is low, signal $m'$ will be high. These high and low voltage levels will be herein afterwards treated as corresponding to the binary digit values of 1 and 0, respectively, with the conduction state of this as well as other flip flops to be later described being characterized by the potential level appearing on its unprimed or $m$ signal output conductor. Thus, when signal $m$ is high, flip-flop M is in its high conduction state or level.

Before continuing with the utilization of the $m$ and $m'$ signals, reference is now made to a timing signal channel 24 having recorded thereon, as discussed previously in general terms, a permanently recorded timing pattern. This magnetic timing pattern is sensed by a "read" head 26, similar to head 20, whose output signal is applied to an amplifier 27, similar to amplifier 22, the output signal of which, in turn, is coupled to the input conductor of another electronic switch such as flip-flop 28. The timing signal recorded on channel 24 will comprise alternately aligned magnetic areas of equal channel length which will produce pulses of alternate positive and negative polarity in the output signal of amplifier 27. These, in turn, trigger flip-flop 28 into alternate conduction states, each being of substantially the same time duration, with its output signal, designated $cl$, accordingly being of a square wave configuration.

Before considering the circuit according to Fig. 2 further, it is well at this point to review in more detail than formerly, the function contemplated for timing signal $cl$, particularly as it relates to the overall operation of digital computer systems employing magnetic memory storages. First of all, clocking signals are employed as a scaling or measuring function for information recording operations on the memory channel. This, in turn, permits individual binary digits to be recorded in discrete spaces on the channel and further eliminates the possibility of scrambling or intermingling of a series of recorded digits. The timing siganl thus provides a means of recording and reading discrete binary bits without any limit as to the number of such digits except as to the physical parameters of the drum and the resolution attainable in the iron oxide coating.

Also, clocking signals provide a means of synchronizing the action between various electronic switches contained in such digital computers and additionally serve to cause the serial transfer, if desired, of the information bits in one flip-flop to the next. The manner in which this transfer is actually accomplished by the clocking signal in conjunction with gating circuits will become more apparent later during further discussion of this and later figures of the present disclosure.

It should also be here noted that the permanently recorded timing signal on channel 24 will not always produce timing intervals of exactly equal duration in signal $cl$ since, in practice, the motor driving the memory wheel will experience slight angular frequency deviations. These deviations will produce in signal $cl$, a slight frequency modulation thereof and will accordingly cause a given binary digit recorded during one timing interval to occupy a slightly differently lengthed space on the information channel than a binary digit recorded during a different interval. Also, since the length of the timing interval during which a digit was recorded may not correspond to the length of the interval during which the digit is "read," it is apparent that the originally noted concept of exact correspondence between channel space length and timing interval duration is not, in practice, maintained.

However, as stated previously, exact time equivalence is required between each digit as "read" with the existing timing signal since all other functions then being performed in the associated computer are controlled by the clock and hence are synchronous in nature. Thus, a resynchronizing action is required between the "read" digit and the then existing timing interval in order that digit's time duration be equal to other binary digits then existent in the various computer flip-flops. This synchronizing action is provided for by picking up each binary digit by "read" head 20 from information channel 10 slightly in advance, approximately one-half of a space to be exact, of where it normally occurs. This is readily accomplished by sliding the "read" head in a direction toward the "write" head so as to slightly decrease the arcuate length of the information channel.

Each digit thus sensed is reproduced as the conduction state of flip-flop M and the digit represented thereby is then brought into exact time synchronization with other binary digits existing in the computer's other flip-flops, etc. by being transferred under control of the clocking signal into another electronic switch, such as flip-flop A.

In particular, output signal *m* is applied to one input terminal of a two terminal "and" gating circuit 30, with the other input terminal thereof being coupled to the output signal *cl* terminal of clocking flip-flop 28. These two input terminals are coupled within circuit 30 to the cathodes of a pair of uni-directional electron flow devices, such as diodes 32 and 33, respectively, preferably of the germanium crystal variety, the anodes of which are mutually connected to one end of a resistor 31 having a relatively high resistance value. The other end of a resistor 31 is coupled to the positive terminal B+ of a source of potential (not shown). The output conductor of circuit 30 is, in turn, coupled to the mutual junction of diodes 32 and 33 and is, in this example, coupled to one plate of a first input capacitor 35 within flip-flop A. The conductor leading to this capacitor is designated the $S_a$ or "set *a*" input conductor of flip-flop A. The other plate of capacitor 35 is coupled to the grid of a first triode therein as well as to the negative terminal of a grid biasing battery, the positive terminal of which is connected to ground.

Gating circuit 38 is structurally similar to circuit 30 with signals *m'* and *cl* being applied to its two input terminals. Its output conductor is coupled to the $Z_a$ input conductor of flip-flop A which, in turn, is internally coupled to one plate of a second input capacitor, the other plate thereof being coupled both to the grid of a second triode therein as well as through a resistor to the grid biasing battery.

As stated previously, signal *m* will assume alternate high and low voltage levels, each appearing for an integral number of timing intervals, and will effectively reproduce the binary values recorded on channel 10. Now, the direction of connection of the diodes within circuit 30, for example, is such that the potential appearing on the mutual junction therein always assumes the lowest potential of the two gating circuit input signals *cl* and *m*. Thus, when signal *m* is low, the mutual junction is low but when signal *m* is high then during the last half of the corresponding timing interval when signal *cl* is also high, then this mutual junction potential will be raised to the high voltage level. Upon such an occurrence, capacitor 35 charges up to that potential from the B+ supply through resistor 31. Now, at the end of the particular interval, signal *cl* switches low again with the result that the mutual junction potential also goes correspondingly low. Upon this occurrence, condenser 35 is discharged through the relatively low resistance of resistor 36 with the result that a negative pulse is produced on the grid of the first triode to which it is connected within the flip-flop.

If now, this triode were initially conducting, correspondingly producing a relatively low plate potential owing to its grid being biased to substantially a zero potential, the negative pulse will act to stop its conduction and its plate potential will correspondingly go high. This plate potential change is cross-coupled to the grid of the other or second triode which, continuing the example, is initially biased to cut off with subsequent non-conduction of the second triode and a correspondingly high plate potential. This change of potential thus coupled to its grid will raise the voltage thereon above cut off and produce a corresponding plate current flow and plate potential reduction. This lowered plate potential is likewise cross-coupled back to the grid of the first triode with the interaction between the pairs of cross-coupled plates and grids continuing until an equilibrium condition is reached wherein the first and second triodes are non and fully conducting, respectively, with respective high and low potential magnitudes appearing at their plates.

The output signal *a* of flip-flop A is derived directly from the plate of the first triode while signal *a'* is taken from the plate of the second triode. Accordingly, it has thus been demonstrated that whenever signal *m* is high for a given timing interval, such high voltage level is transferred at the end of that interval to the conduction state of flip-flop A such that its output signal *a* is likewise at its high voltage level but during the next timing interval. The significance of the $S_a$ or "set *a*" designation for the input conductor coupled to gating network 30 becomes also apparent since, whenever a triggering signal is applied thereto, such as by signal *m* being at a high voltage level, the resulting conduction state of flip-flop A is such that signal *a* is at a high voltage level and flip-flop A may thus be said to be in its set or high conduction state.

As stated previously, the input conductor to flip-flop A from gating network 38 is termed the $Z_a$ or "zero *a*" conductor. Network 38 operates relative to signal *m'* as does network 30 to signal *m* in the manner before explained, and whenever signal *m'* of flip-flop M is at its high voltage level, corresponding to a low voltage level for signal *m*, a triggering signal will be applied to the second triode within the flip-flop at the end of the interval. Thus, if the second triode were fully conducting and hence producing to a low voltage level in signal *a'*, this activation through its $Z_a$ input conductor will cause the first and second triodes to revert to conducting and non-conducting states, respectively, with signals *a* and *a'* going to their low and high voltage levels, respectively. This, in turn, corresponds to a zero digit value for signal *a* and the conduction state of flip-flop A may be said to be in its low or zero state.

It is accordingly seen that each high voltage level appearing in signal *m* is transferred at the end of that timing interval into a corresponding high voltage level in signal *a* at the beginning of the next following interval. Likewise, each high voltage level appearing in signal *m'* is transferred at the end of that interval into a corresponding high voltage level in signal *a'* at the beginning of the next interval. As will be equally evident, if signal *a* is initially high and a triggering signal is applied to the $S_a$ input conductor, no change of conduction state of flip-flop A will be produced since the first triode therein was already at its non-conducting state owing to its grid being biased to cut off. In the same manner, if signal *a'* is high and another triggering signal is applied to the $Z_a$ input conductor, no further change of the flip-flop A conduction state is produced.

At this point in the circuit of Fig. 2, signals *a* and *a'* correspond exactly to the binary digit values appearing at point 13 in the schematic presentation of Fig. 1. Stepping or short register 15 of Fig. 1 is here illustrated in detail and comprises four serially connected electronic switches, such as flip-flops $L_1$, $L_2$, $L_3$ and $L_4$. Also, the function performed by manually operable switch 18 in Fig. 1 is herein performed electronically by diode gating circuits in conjunction with flip-flops A, $L_1$ and $L_4$ as well as an electronic switch, such as flip-flop X, whose conduction state is initially determined by the position of a switch 40.

Specifically, the movable switch arm of switch 40 is connected to the negative terminal of a source of potential, such as battery 41, the positive terminal thereof being connected to ground. The movable switch arm, in turn, is adapted to make selective engagements with the $S_x$ and $Z_x$ input conductors of flip-flop X. Flip-flop X may be similar to flip-flop A but without the two input capacitors coupled to the $S_a$ and $Z_a$ input conductors thereof. Thus, when the switch arm is thrown to engage the $S_x$ input conductor, the negative potential of battery 41 is placed on one triode therein with the result that signals *x* and *x'* will be at their high and low voltage levels. The other contact position, that is, the engagement between the switch arm and the $Z_x$ input conductor, in turn, reverses the conduction state of flip-flop X such that signals $x$ and $x'$ are at their low and high levels, respectively.

In accordance with the principles established in connection with Fig. 1, the binary digits emanating as electrical signals from head 20 are to be restored to the information channel and hence must be recorded again thereon. Thus, a recording or "write" head 44, similar in structure to head 20, is located adjacent track 10, head 44 being supplied with the amplified output signals of an amplifier 45 which, in turn, receives as input signals the output signal of a "write" gating circuit 46. Now, the conduction state of flip-flop X determines whether head 44 receives directly the binary values represented by complementary signals $a$ and $a'$ or receives for recording purposes the output signals from the final stage $L_4$ of register 15. If the latter function is performed, the flip-flop X conduction state also serves to order the values represented by signals $a$ and $a'$ stepped serially into the first stage $L_1$ of the register. Also, if the former function is performed, that is, if the signal $a$ values are directly recorded by head 44, then the information contained in the register is serially recirculated by electronically coupling the output terminals of stage $L_4$ directly to the input conductors of first stage $L_1$. With this accomplished, the contents in each register flip-flop will be serially stepped at the beginning of each timing interval from one to another in a chain-like fashion.

Reduced to its simplest terms, the conduction state of flip-flop X determines whether in one instance the values of signal $a$ are transferred directly to amplifier 45 with the output values of flip-flop $L_4$ being, simultaneously therewith, transferred directly into flip-flop $L_1$, or whether signal $a$ is transferred serially through register 15 and then to amplifier 45. This operation is achieved through the use of register input gating networks 48 and 49 and the previously noted recording gating network 46.

Specifically, gating network 48 comprises a pair of "and" gating circuits 51 and 52 whose output conductors are coupled to the input conductors of an "or" gating circuit 53. The output conductor of circuit 53, along with the clocking signal $cl$ conductor are coupled to the input terminals of a final "and" gating circuit 54, the output signal of which constitutes the output signal of the network and is applied to input conductor $S_{1_1}$.

Circuit 51 is formed by connecting the $x'$ and $a$ signal conductors through two diodes to a common junction, which junction is connected through a resistor to the positive terminal B+ of a source of potential (not shown). Another diode, constituting an element in "or" circuit 53, positioned similarly to the first two, is connected between the common junction and one end of another register in circuit 53, the other end of the resistor being grounded. "And" gating circuit 52 is similar to circuit 51 with the diodes therein being connected to the signal $x$ and $l_4$ conductors with the common junction therein being coupled through a diode within circuit 53 to the resistor therein. The output conductor of "or" gating circuit 53 is connected between the common junction therein and the cathode of another diode within "and" gating circuit 54, similar to circuits 51 and 52. The signal $cl$ conductor is also applied through the usual diode to circuit 54.

The output conductor of circuit 48 is connected between the common junction of the final "and" gating circuit 54 therein and the $S_{1_1}$ conductor of flip-flop $L_1$. In operation, gating circuits 51 and 52 operate similarly as described previously for circuits 30 and 38 in Fig. 2. Thus, the common junction of circuit 51 will be at a high voltage only upon simultaneously appearing high voltage levels in signals $x'$ and $a$, while the common junction of circuit 52 will likewise be high only when signals $x$ and $l_4$ are simultaneously high. Considering now the operation of "or" gating circuit 53, it will be seen that, owing to the direction of connection of diodes therein, the common junction between them and the resistor will be high if either or both of common junctions 51 and 53 are high and will be low only if both are simultaneously low. Thus, a high voltage level appears on the output conductor of "or" circuit 53 if either or both of the input conductors thereto are at a high voltage level.

Since signal $cl$ is high for half of each interval, a triggering action will be produced on the $S_{1_1}$ input conductor either if signals $x'$ and $a$ are simultaneously high or signals $x$ and $l_4$ are simultaneously high since, upon either occurrence, circuit 53 will produce a high output voltage level.

Considering now gating circuit 49, there is included therein an "and" gating circuit 55 having its two input conductors connected to the signal $a'$ and $x'$ conductors with its output conductor being coupled to an "or" gating circuit 57, similar to circuit 53 in network 48. A second "and" gating circuit 56 has its two input terminals connected to the signal $x$ and $l_4$ output conductors, respectively, its output terminal also being connected to "or" gating circuit 57. As formerly, the output conductor of gating circuit 57 is connected along with timing signal $cl$ conductor to the input terminals of "and" gating circuit 58, the output conductor of which is connected to the $Z_{1_1}$ input conductor of flip-flop $L_1$. Network 49 operates similarly to network 48 in that whenever signals $a'$ and $x'$ or signals $x$ and $l'_4$ are simultaneously at their high level, a triggering action will be produced at the end of that timing interval.

Networks 48 and 49 may be initially derived from a so-called truth or Boolean table wherein would be set forth the various combination of signal $a$ and $l_4$ values and the particular triggering functions desired for flip-flop $L_1$ in accordance with the established criteria for the functioning of flip-flop X. Thus, when signal $x=1$, each signal $a$ value is to be transferred into flip-flop $L_1$ at the end of its corresponding timing interval. Thus, the table would be written so that whatever the signal $a$ values appeared, corresponding triggering signals would be applied to flip-flop $L_1$ such that, at the beginning of the following timing interval, signal $l_1$ would be set equal thereto as a result. On the other hand, the table would include lines for signal $x=0$ values wherein the signal $l_4$ values would be transferred into flip-flop $L_1$ as the conduction states thereof. From the various columns within the table Boolean equation could be quite readily written defining the operations set forth in the table and from the Boolean equation, after appropriate complexity reductions in accordance with Boolean algebra rules, as well understood by those skilled in the art, the actual gating circuitry of networks 48 and 49 may be drawn and constructed.

In particular, the equations defining networks 48 and 49 may be set forth as follows:

$$S_{1_1}=(x'\cdot a+x\cdot l_4)\cdot cl \quad \text{(Eq. 1)}$$

$$Z_{1_1}=(x'\cdot a'+x\cdot l_4')\cdot cl \quad \text{(Eq. 2)}$$

Analysis of these equations reveals that from Eq. 1, triggering signals will be applied to set the $L_1$ flip-flop whenever signals $a$ and $x'$ are simultaneously high or signals $x$ and $l_4$ are simultaneously high, neglecting signal $cl$. In the same manner, flip-flop $L_1$ will be zeroed whenever signals $a'$ and $x'$ are simultaneously high or signals $x$ and $l_4'$ are simultaneously high. It is additionally seen that the first term in each equation, that is the one bearing the $x'$ term, orders the contents of flip-flop A transferred into flip-flop $L_1$, and the second term in each equation, that is, the one having the $x$ term, orders the contents of flip-flop $L_4$ transferred into $L_1$.

Recording network 46 includes a pair of "and" gating circuits 60 and 61, the output terminals of which are coupled to the input conductor of an "or" gating circuit 62, the output signal of which constitutes the output signal of the network as applied to amplifier 45 and subsequently recorded by head 44. Signals $x$ and $a$ are applied as the input signals to circuit 60 while signals $x'$ and $l_4$ are applied as input signals to circuit 61. Recalling that the function to be performed thereby is to record the values of signal $a$ directly on information channel 10 whenever the high conduction state is present in flip-flop X and record the output signal $l_4$ values when flip-flop X is at its low conduction state, a truth table may be set up and from the table, a Boolean equation defining the gating circuitry may be written as:

$$(x \cdot a + x' \cdot l_4) \qquad \text{(Eq. 3)}$$

From the equation it can be readily seen that whenever signals $x$ and $a$ are simultaneously high, a high voltage level will appear on the output conductor thereof and hence be recorded by head 44 as a binary value of one on channel 10. Conversely, if signal $x$ should be high and signal $a$ low then a low voltage level corresponding to the specific value of signal $a$ will appear on the output terminal which, in turn, will cause a binary value of zero to be recorded on the channel. In the same manner, when signal $x'$ is high, the specific value appearing simultaneously therewith in signal $l_4$ will be recorded on the information channel.

As will be observed, timing signal $cl$ is not utilized in circuit 46, the reason being that signal $cl$ is at the high level for only one-half of each timing interval. Hence, were it to be utilized, then each high voltage level to be recorded by head 44 would only appear for one-half of the space normally allotted on the channel for each single value.

The basic purpose intended for the presentations of Figs. 1 and 2 is to illustrate generally the manner by which binary information may be recirculated on a magnetic wheel in synchronization with a permanently recorded clocking channel, also on the wheel, the manner in which the recorded binary digits may be grouped into units of four to represent, for example, a corresponding Arabic digit, symbol, or letter, and further the manner in which a series of binary numbers of two sets of binary numbers may be interlaced on the information channel. Furthermore, the embodiments shown in these figures serve to illustrate the principles involved in precessing the information, of how a given binary number in one binary number set may be isolated in a stepping register while the remaining information recirculates, how the number thus isolated may, at the proper time, be brought back into the information channel in proper interlaced sequence with the other numbers and the next following number of the same set of numbers isolated, and so forth. Primarily, it is this isolating function as illustrated and described that permits the identification of the number while it is contained within the register.

Figure 3:
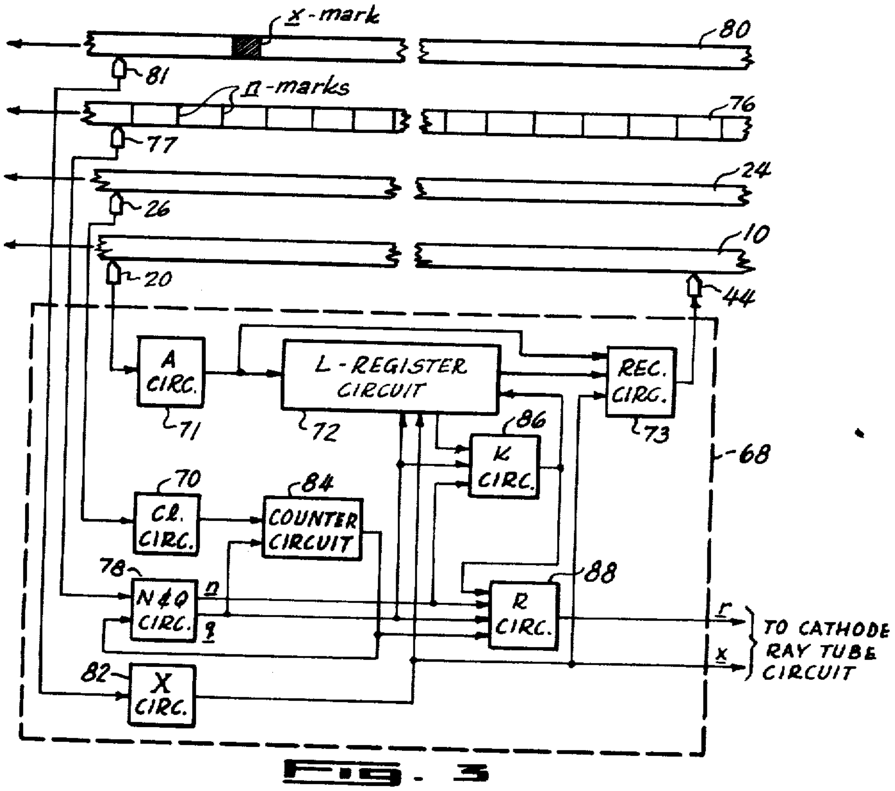
Fig. 3 is a block schematic diagram of the computer unit of the system according to the present invention.

There is illustrated in Figure 3, in block schematic form, the computer unit 68 of the read-out system which, in conjunction with the memory channel and a pair of additional channels to be later described furnish means of isolating a given binary number of one set of binary numbers, identifying the given number, moving in and isolating the next number of the same set, identifying this next number, and so forth. The complete read-out system, it should be here noted, is fully illustrated in Figure 6, the portions here shown being primarily the computer unit thereof.

In particular, information channel 10 is again illustrated as are its associated "read" and "write" heads 20 and 44, respectively. Also, timing track 24 is again illustrated as is its "read" head 26, head 26 being connected to $cl$ circuit 70 within unit 68, circuit 70 corresponding to amplifier 27 and flip-flop 28 as previously illustrated in Figure 2. The information "read" head 20 is coupled to an A circuit 71 which, in turn, corresponds to amplifier 22, synchronizing flip-flop M, "and" gating circuits 30 and 38, and finally flip-flop A, all previously shown in Figure 2. The output signal of A circuit 71 is applied to an L-register circuit 72 as well as a record circuit 73.

Another channel 76 is on the memory wheel, channel 76 having permanently recorded thereon a series of $n$ marks, 16 in number, the length and placement of which relative to the number grouping on information channel 10 being later set forth. These permanently recorded $n$ marks are sensed by a "read" head 77, similar to head 26, the output signal of which is applied to a N and Q circuit 78. A final channel 80 on the memory drum is utilized, channel 80 having permanently recorded thereon a single $x$ mark, the length and placement of which relative to the $n$ marks and to the numerical information on channel 10 being set forth in greater detail later. This $x$ mark on track 80 is scanned by a "read" head 81, similar to head 26, the output signal of which is applied to an X circuit 82.

In addition to the circuits thus far described within the computer unit, there is illustrated in block schematic form, a counter circuit 84, a K circuit 86 and a R circuit 88. Circuit connections are provided between $cl$ circuit 70 and each of the other circuits, it supplying thereto the synchronizing clocking signal. The only one of such connections specifically illustrated however is the one to counter circuit 84 which acts, in a manner to be later described, to count the signal $cl$ timing intervals. N and Q circuit 78 includes a pair of output conductors, designated $n$ and $q$, the $q$ one being coupled to the input terminals of counter circuit 84, L-register circuit 72, K circuit 86, and R circuit 88 with the $n$ conductor being coupled to input terminals of the K and R circuits.

The output terminal of counter circuit 84 is connected to another input terminal of N and Q circuit 78 and is additionally connected to an input terminal of R circuit 88. The output terminal of X circuit 82 constitutes one of the computer unit output terminals and is additionally connected to an input terminal of L-register circuit 72 and an input terminal of record circuit 73 while the L-register circuit supplies input signals to record circuit 73 and K circuit 86. The output signal of K circuit 86, in turn, is applied to an input terminal of the L-register circuit 72 and an input terminal of R circuit 88 while the output conductor, designated $r$, of the R circuit constitutes one of the output conductors of unit 68.

Figure 4:
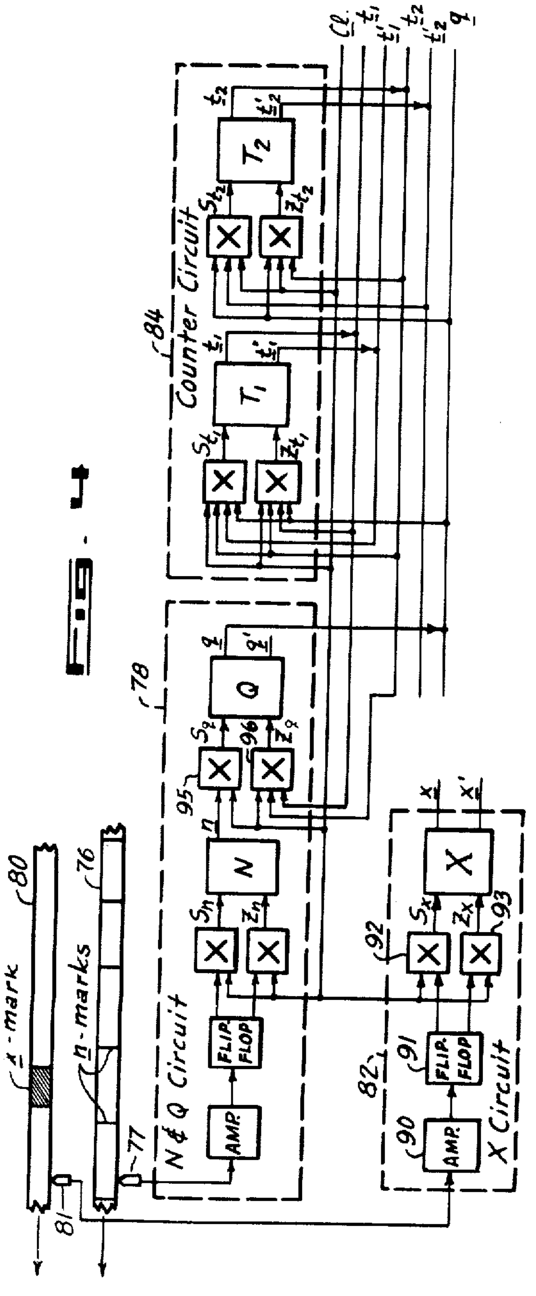
Figs. 4 and 5 are detailed circuit diagrams of portions of the computer unit of Fig. 3.
Figure 5:
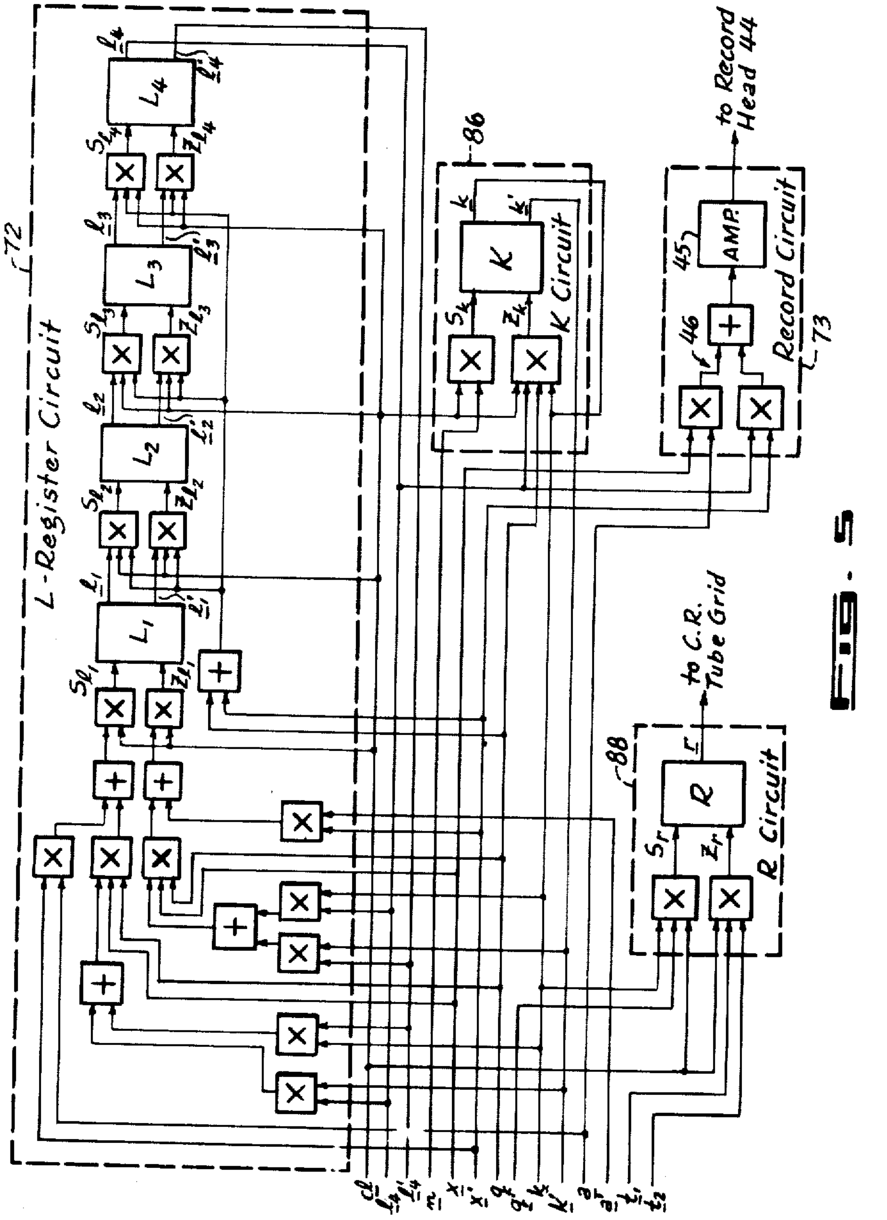

L-register circuit 72, K circuit 86, R circuit 88, and record circuit 73, are shown in specific detail in Figure 5, while, in Figure 4, is found detailed circuit diagrams of N and Q circuit 78, counter circuit 84, and finally, X circuit 82.

Figure 6:
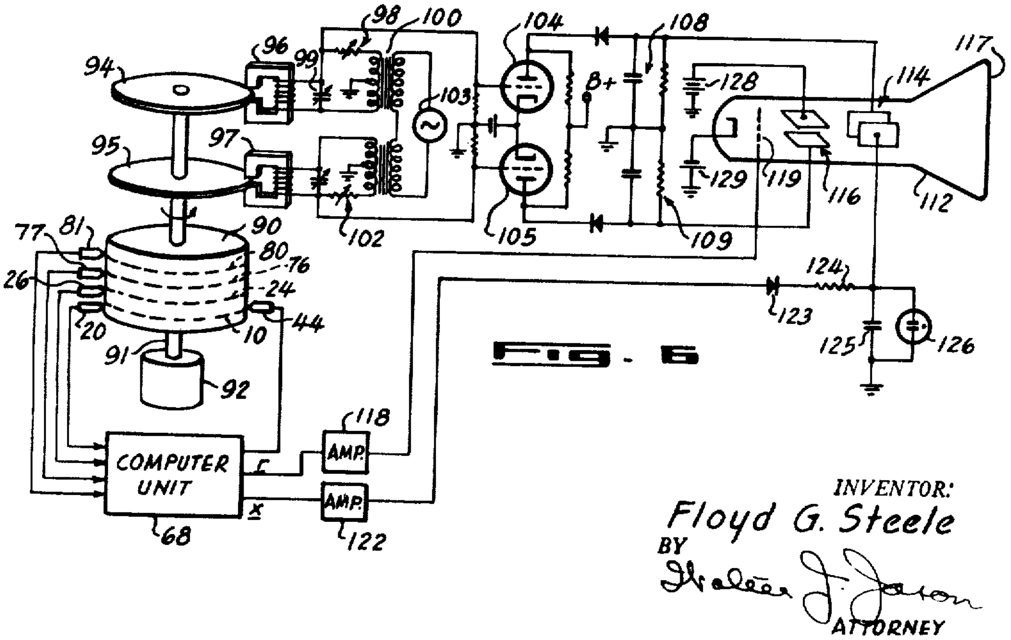
Fig. 6 is a circuit diagram, partly in block schematic form, of the computer read-out system according to the present invention.

Although a complete understanding of the complete read-out system as further exemplified in Figure 6 is impossible to be had by considering the operation of this computer unit alone, it is nevertheless well at this point to consider certain principles involved in the unit's operation which later will be associated with the system's operation. Assume, for the purposes of example, that number $d_1$, as previously illustrated in Figure 1, is to be isolated in the L-register circuit for one complete rotation of the memory drum. Now $d_1$, as before stated, is composed of four binary digit values and accordingly may have any one of sixteen possible values, i. e., between and including 0000 and 1111. The prime objective of the computer unit is to identify during the one full wheel revolution, the particular value of this isolated binary number which value, in turn, may correspond, as before stated, to an Arabic numeral, punctuation mark, etc. Specifically, this identification process takes the form of a single high voltage level produced on the signal $r$ output conductor of unit 68, the period of time of its appearance relative to the exact angular position of the memory drum, in turn, indicating the value of $d_1$.

Particularly, during the wheel's single revolution, sixteen consecutive individual subtraction processes are performed, each subtraction acting to reduce by one binary digit value, the value of the number then appearing in the L-register. Stated differently, after, for example substantially the first 1/16 of the drum revolution following the isolation of $d_1$, a binary value of one is to be subtracted therefrom, then, following the completion of the next 1/16 drum revolution another binary value of one is to be again subtracted in the same manner from the number then appearing in the register. These series of subtractions are continued until a total of sixteen have been completed by the time the drum has substantially completed its stated revolution.

Two things will be simultaneously accomplished by these subtractions. First of all, at the conclusioin of the subtractions, the binary number remaining will be identical value to the original one, since sixteen in the decimal number system equals 10000 in binary terms and, considering only the four significant digits thereof, an effective zero valued binary number has been subtracted therefrom. This, of course, leaves the isolated number with the same magnitude as before the subtractions and thus it can, at that time, be reinserted into the memory without any change in its magnitude.

Secondly, during the time of the successive subtractions there will appear at the conclusion of one of them all zeros in the register. Then, at the end of the next subtraction all of the zeros will be changed to ones as will the carry digit from the final or most significant digit subtraction. Since the carry digit remaining from the last signfiicant digit subtraction will be of value one only after this particular change of L-register number value, and since each of the sixteen possible values that $d_1$ may take will produce such a carry or overflow digit only after a different number of subtractions has been made, the computer unit is accordingly enabled to produce an output signal relative to the angular position of the drum representing the value of the then being sampled L-register number.

For example, if $d_1$ equals 0010, then the first of the sixteen successive subtractions would leave the value 0001. Then, the second of such subtractions would leave the value of 0000 in the register and the third subtraction would result in the carry or overflow digit as above noted. This overflow occurring just after the third subtraction would thus be an indication of the value of the original number and the computer unit would signal such fact to the read-out system by producing a high voltage level on its output conductor *r*.

Considering now the operation of computer unit 68 with reference to the specific circuit diagrams of the various circuit components thereof, X circuit 82, found in detail in Figure 4 is the first circuit to be discussed. Circuit 82 includes an amplifier 90, corresponding to amplifier 22 of Figure 2, whose input terminal is connected to "read" head 81 and whose output terminal is coupled to a synchronizing flip-flop 91, corresponding to flip-flop M in Figure 2. The pair of output conductors of flip-flop 91 are connected to one input terminal of each of two "and" gating circuits 92 and 93, respectively, the other input terminal thereof being coupled to the timing signal *cl* conductor. The output conductors of "and" gating circuits 92 and 93 are connected to the $S_x$ and $Z_x$ input conductors, respectively, of an electronic switch, such as flip-flop X, flip-flop X producing complementary output signals $x$ and $x'$ on its two output conductors.

Flip-flop X corresponds in function to flip-flop X of Figure 2, the function being that its conduction state either orders the information channel digits passed through the L-register or else orders the L-register contents isolated with the information digits being recirculated directly from head 20 to head 44. Instead of having a manually operable switch for controlling the conduction state of flip-flop X, as was formerly done in Figure 2, it is here controlled by the permanently recorded *x* mark appearing on channel 80. This *x* mark is eight spaces in length around the circumference of track 80 and comprises, for that length, a magnetic particle orientation opposite to the remaining portion of the channel. In particular, the operation of X circuit 82 is such that when the leading edge of the *x* mark passes head 81, flip-flop 91 is triggered to its low voltage state which state, in turn, is transferred to flip-flop X through its $Z_x$ input conductor. Then, upon passage of the trailing edge of the *x* mark, eight timing intervals later, the flip-flop 91 conduction state is reversed and the conduction state of flip-flop X is accordingly changed to its high level at the beginning of the next following interval. Thus, the *x* mark magnetization pattern corresponds to a continuous binary zero value with the remaining portion of the channel corresponding to the binary one value.

Recalling now the function of flip-flop X in the Figure 2 circuit, during the passage of the *x* mark under head 81, the X flip-flop, by being in its low voltage state, will order recirculation of the memory serially through the register. During the remaining portion of the passage of channel 80, a given binary number will be isolated in the register while the information will be passed directly from head 20 to head 44. Preferably, the trailing edge of the *x* mark and subsequent triggering of flip-flop X should correspond timewise with the complete containment within the L-register of any one of the eight"*d*" binary numbers on the information channel. If this is done, then each drum revolution will actuate flip-flop X in the manner described and the consecutive "*d*" binary numbers will appear, one each drum revolution, in the L-register and hence be available during the remaining portion of the revolution, that is, before the next *x* mark appearance, for read-out purposes.

Once a given binary number has been isolated in the register, then, during the remaining portion of the drum revolution, as stated previously sixteen successive subtractions of the binary digit one are performed on the number, each subtraction being initiated by the appearance of a permanently recorded *n* mark adjacent head 77 on channel 76.

In particular, each *n* mark is of one space in length along channel 76 and comprises essentially a recording of a binary digit one value. The channel between consecutive *n* marks may be considered as a continuous zero binary value. Thus, in Figure 4, head 77 responds to each of such *n* marks to produce appropriate positive and negative pulses which are applied to N and Q circuit 78. Within circuit 78, they are amplified by an amplifier and then applied to a synchronizing flip-flop, similar to amplifier 22 and flip-flop M, respectively, described previously in connection with Figure 2. The complementary output signals of the synchronizing flip-flop are, in turn, coupled through appropriate "and" gating circuits, with timing signal *cl* to the $S_n$ and $Z_n$ input conductors of an electronic switch, such as flip-flop N. Flip-flop N will accordingly be triggered to its high conduction state for one timing interval during each passage of an *n* mark on channel 76 and will be at its zero level during the time between consecutive mark appearances.

Signal *n* is applied with clocking signal *cl* to an "and" gating circuit 95 the output terminal of which is coupled to the $S_q$ input conductor of another electronic switch, such as flip-flop Q. Accordingly, one timing interval after each elevation of signal *n* to its high voltage level, flip-flop Q will be triggered to its high conduction level with signal *q* correspondingly being at its high voltage level. At this point, the interaction between N and Q circuit 78 and counter circuit 84 becomes important.

Briefly, with signal *q* at its high voltage level, counter circuit 84, comprising a pair of electronic switches, such as flip-flops $T_1$ and $T_2$, is ordered to initiate counting, in binary steps, the timing intervals as they are measured or indicated by timing signal *cl*. Now, counter circuit 84 counts for four consecutive timing intervals at which time it automatically applies a triggering signal to the $Z_q$ input conductor of flip-flop Q through a three terminal "and" gating circuit 96. Upon this occurrence, flip-flop Q will accordingly be triggered to its low voltage level, which low voltage level will halt the counting function previously performed by the counter circuit for the previous four timing intervals. As will be later seen, signal $q$ by being at its high voltage level for the four timing intervals following each $n$ mark as counted by circuit 84 will, in turn, order a binary value of one subtracted from the binary number then contained in the L-register circuit. By signal $q$ going high and, in turn, initiating the counting performed by circuit 84, a timing measure is had of the concurrently produced subtraction process since the counter circuit after attaining a predetermined count, will act, in turn, to shut off the Q flip-flops which, in turn, stops both the subtraction process and the counting.

Considering now the connections within circuit 84, such were derived by arbitrarily placing flip-flops $T_1$ and $T_2$ at their zeroed state during the interval signal $q$ is at its low voltage level and no counting takes place. When, however, signal $q$ goes high, then the counting, as represented by the voltage levels of signals $t_1$ and $t_2$, changes during consecutive timing intervals from 00 to 01 to 10 to 11. Upon attainment of the 11 or final count, the circuit connections are much, within circuit 78, that flip-flop Q is then automatically zeroed simultaneously as both $T_1$ and $T_2$ flip-flops change to their zero state. The counting process thus stops and a 00 count remains in circuit 84 until the next $n$ mark appearance.

Thus the gating circuitry connected to the $S_{t1}$, $Z_{t1}$, $S_{t2}$ and $Z_{t2}$ input conductors of the two-flip-flops may be expressed in terms of the following Boolean equations:

$$S_{t1}=q.t_1'.t_2.cl \quad \text{(Eq. 4)}$$

$$Z_{t1}=q.t_1.t_2.cl \quad \text{(Eq. 5)}$$

$$S_{t2}=q.t_2'.t_2.cl \quad \text{(Eq. 6)}$$

$$Z_{t2}=q.t_2.cl \quad \text{(Eq. 7)}$$

Returning now to N and Q circuit 78, since the Q flip-flop is to be zeroed after signals $t_1$ and $t_2$ simultaneously attain their high level, then the Boolean equation expressing the gating circuit 96, connected to the $Z_q$ input conductor thereof, is:

$$Z_q=t_1.t_2.cl \quad \text{(Eq. 8)}$$

Referring now to Figure 5, there is set forth in detailed diagrammatic form, L-register circuit 72, K circuit 86, record circuit 73, and R circuit 88. Circuits 72 and 86 jointly operate to provide the previously mentioned successive subtractions of each number isolated in the L-register. For understanding this particular phase of operation of the computer unit, assume that the trailing edge of the $x$ mark on channel 80 has just passed head 81 with the result that a given binary number is isolated in the L-register with its least through its most significant place digits lying in the $L_4$ through $L_1$ flip-flops. Between the time of this isolation and the appearance of the first $n$ mark on channel 76, the contents of the register remain stationary, that is, no series stepping between the $L_4$ and $L_1$ contents takes place, the only action in the computer being that the memory is recirculated from the "read" to "write" heads. Now, upon the appearance of the first $n$ mark following the trailing edge of the $x$ mark, the N flip-flop is set to its high conduction state for one timing interval as stated before and this, in turn, will be transferred at the end of the timing interval to an electronic switch, such as flip-flop K within K circuit 86.

Simultaneously with the setting of the K flip-flop, the Q flip-flop, in the manner formerly discussed, will also be triggered to its high conduction state and, at the beginning of the next following interval, counter circuit 84 will initiate its counting operation. This high voltage level in signal $q$ as discussed previously, will remain high for four more consecutive timing intervals and this conduction state, in turn, orders through the corresponding gating circuitry in the L-register circuit the following operation to take place.

During the first timing interval signal $q$ is at its high voltage level, the binary digit one, as it appears in the contents of flip-flop K, is ordered subtracted from the contents of the $L_4$ flip-flop, the sum digit thereof being ordered transferred at the beginning of the next following timing interval into the contents of flip-flop $L_1$. Also, the carry digit of the subtraction process is simultaneously therewith ordered placed into the K flip-flop at the beginning of this next timing interval and the consecutive values then appearing in the $L_1$, $L_2$ and $L_3$ flip-flops are ordered shifted right to thus appear at the beginning of this next timing interval in the $L_2$, $L_3$, and $L_4$ flip-flops, respectively. This process, since signal $q$ is still high, is then repeated at the next timing interval with, once more, the contents of flip-flop K representing the carry digit of the first significant digit subtraction being again subtracted from the contents of flip-flop $L_4$, the sum and carry digits of this subtraction being again ordered transferred at the beginning of the next interval into the $L_1$ and K flip-flops, respectively, with the shifting right process also again being ordered.

This sequence of operations is continued for the four intervals flip-flop Q remains at its high voltage level. When the counter circuit has finished counting the four intervals, then flip-flop Q is zeroed and this subtraction process is then stopped and the new number, equal to the old number minus one will then appear in the L-register, the minus one being produced by the value of one initially set into the carry flip-flop K.

Nothing further happens in the L-register or the K circuit until the next $n$ mark appearance at which time, flip-flop N is again triggered to its high level for one interval with the result that the K and Q flip-flops are again set to their high conduction states. With this occurrence, the previously described cycle of operation is repeated, step by step, and another binary value of one is subtracted from the four place binary number in the L-register. As there are sixteen $n$ marks arranged between the trailing and leading edges of the $x$ mark, this operational cycle is repeated a total of sixteen times. Since, as pointed out previously, successively subtracting sixteen binary digit one values from the four place number in the register will at the end of the time, completely reestablish the original number in the register regardless of its initial value. Hence, the leading edge of the $x$ mark, in making its next appearance will find the same number in the register as was initially stepped therein. It, in turn, operates the X flip-flop such that the binary number in the register will return to its position on the memory channel and the next binary number of the same set will be inserted in the L-register circuit by the end of the appearance of the $x$ mark. As formerly, when this occurs, the number will be isolated in the register and upper appearance of the $n$ mark first following the trailing edge of the $x$ mark, the series of sixteen successive subtractions will again take place by the next appearance of the leading edge of the $x$ mark.

Before considering the remaining portions of the computer unit specifically utilized to recognize the value of each binary number as it undergoes the successive subtractions, it is well to consider the other and remaining function required for the L-register circuit. As was formerly the case in Figure 2, when signal $x$ is at its low voltage level, as it will be during the passage of the $x$ mark on channel 80, the output values from circuit 71, representing the recorded values on channel 10, are to be transferred serially through the L-register circuit and then, from the output $L_4$ flip-flop thereof, be recorded on channel 10. These two simultaneous functions are provided for by gating circuitry connected to the input conductors of the $L_1$ flip-flop such that if signal $x$ is at its low voltage level then the signal $a$ values are successively stepped into $L_1$ and from there through the register while if signal $x$ is at its high voltage level, signifying isolation of a number, then one of two things is done as determined by the conduction state of flip-flop Q. If signal $q$ is high, representing the subtraction process, then the contents of flip-flop $L_4$ are considered in accordance with the carry digits within flip-flop K for determining the value to be transferred into flip-flop $L_1$. If signal $q$ is low, as it will be between subtraction operations, then the contents appearing in the register are to, in this case, remain stationary in direct contrast with the circuit of Figure 2 wherein the information proceeded chainwise around the register.

These above mentioned functions are performed by the gating circuitry connected to the $S_{l_1}$ and the $Z_{l_1}$ input conductors of flip-flop $L_1$ and may be expressed in Boolean terms as:

$$S_{l_1}=[x'.a+x.q.(l_4'.k+l_4.k')].cl \quad \text{(Eq. 9)}$$

$$Z_{l_1}=[x.'a'+x.q(l_4'.k'+l_4.k)].cl \quad \text{(Eq. 10)}$$

In the same way, the gating circuitry performing the triggering operations required for the second flip-flop $L_2$ may be expressed by the Boolean terms:

$$S_{l_2}=(x'+q).l_1.cl \quad \text{(Eq. 11)}$$

$$Z_{l_2}=(x'+q).l_1'.cl \quad \text{(Eq. 12)}$$

The gating connections to the input conductors of the $L_3$ and $L_4$ flip-flops are similar to the equations above given for the $L_2$ flip-flop except in each case the unprimed and primed output signals of the preceding flip-flop are applied to the gating circuits connected to its set and zero input conductors, respectively, rather than the $l_1$ and $l_1'$ terms found in the equations.

In the same manner, the circuit connections to the input conductors of flip-flop K may be expressed by the pair of Boolean equations:

$$S_k=n.cl \quad \text{(Eq. 13)}$$

$$Z_k=l_4.q.k.cl \quad \text{(Eq. 14)}$$

The means employed to identify the value of each binary number stored in the L-register is based on a unique property of the subtraction process herein employed. This property reveals itself when, after a given number of successive subtractions have been performed, the number of subtractions being based on the initial magnitude of the binary number in the register, the value 0000 is attained. Upon the next $n$ mark appearance and subsequent subtraction operation, the four zeros, 0000, will be replaced by four ones, 1111, and, in this substance only, the carry digit remaining in flip-flop K after the subtraction is completed will be equal to one, all other subtractions yielding a final zero carry digit value. Thus, if each $n$ mark on channel 76 is associated with a particular binary number value, then the particular $n$ mark causing a carry digit number to remain after its particular subtraction operation has been completed, may thus be recognized by the fact that the K flip-flop is at its high conduction state simultaneously when the Q flip-flop is at its low voltage level, it having been switched thereto at the completion of that individual subtraction process.

Thus, R circuit 88, illustrated in detail in Figure 5, has signals $q'$, $k$ and $cl$ applied to a three terminal "and" gating circuit whose output terminal is connected to $S_r$ input conductor of an electronic switch, such as flip-flop R. Thus, whenever signal $q'$ is high, as it will be following each individual subtraction operation, simultaneously when signal $k$ is high, signifying a carry digit, then a triggering signal will be applied to the $S_r$ conductor with its output signal $r$ accordingly being raised to a high potential level. This high level, in turn, may be applied to a cathode ray tube, as it is in Figure 6, to unblank the grid thereof and cause a symbol corresponding to the identified binary number to be presented on the screen thereof.

Flip-flop R will remain in its high state through the appearance of the next $n$ mark until the counter attains the count of 11 at which time a triggering signal is applied to its $Z_r$ input conductor to return it to its low conduction level. This is accomplished by applying, along with signal $cl$, the counter output signals $t_1$ and $t_2$ to an "and" gating circuit connected to its $Z_r$ input conductor.

The particular gating circuitry connected to the input terminals of flip-flop R may be expressed by the Boolean equations:

$$S_r=q'.k.cl \quad \text{(Eq. 15)}$$

$$Z_r=t_1.t_2.cl \quad \text{(Eq. 16)}$$

Record circuit 73, illustrated in specific detail in Figure 5, includes record gating network 46 and amplifier 45, both shown previously in Figure 2. Its function and mode of operation here is similar to that previously described in connection with Figure 2.

Referring now to Figure 6, there is illustrated the overall computer read-out system according to the present invention but showing computer unit 68 in block diagrammatic form. The rotatable magnetic memory drum 90 is here illustrated for the first time, it being affixed to the shaft 91 of a motor 92, preferably of a synchronous alternating current type. Recorder around the periphery of drum 90 are found the previously discussed tracks 10, 24, 76, and 80 whose recorded information is scanned by "read" heads 20, 26, 77 and 81, respectively. The output signals of these heads are applied, as formerly illustrated, to computer unit 68 with "write" head 44, again illustrated, being adjacent track 10 and receiving recording signals from unit 68.

A pair of horizontal and vertical deflection disks 94 and 95, respectively, are attached to the upper end of motor shaft 91 and serve, in a manner to be later explained, for providing proper deflection potentials for the vertical and horizontal deflection plates of a cathode ray tube. A pair of electromagnetic pick-up heads 96 and 97, each of C-shaped configuration, are positioned so as to intercept the outer perimeters of disks 94 and 95 between their respective pole faces.

The wire coil on pick-up head 96 is connected to a parallel resonant circuit 98 and, in particular, across the plate of a variable capacitor 99, one plate of which, in turn, is connected through a variable resistor to one end of the secondary winding of a transformer 100. The other plate of condenser 99 is connected directly to the other end of the secondary winding of transformer 100, the center tap of the winding being grounded.

In the same manner, the coil of pick-up head 97 is connected across a variable capacitor constituting a portion of the other resonant circuit 102, corresponding exactly to circuit 98. Adjacent ends of the primary windings of the transformers within circuits 98 and 102 are connected together, with their opposite ends being connected to the two output terminals of an oscillator 103.

The output signals of circuits 98 and 102 appear at the junctions between the variable capacitors and resistors therein and, in turn, are applied to the grids of a pair of triodes 104 and 105, respectively. The cathode and grid connections of triodes 104 and 105 are made in accordance with the established amplifier art with their plates being coupled through plate resistors to the B+ terminal of a source of potential not herein specifically illustrated. The plate of triode 104 is further coupled through a diode to one end of a resistor-capacitor filter circuit 108 while the plate of triode 105 is likewise coupled through a diode to one end of a similar resistor-capacitor circuit 109, the other ends of circuits 108 and 109 being coupled to ground. The filtered output signals of triodes 104 and 105 are applied to one of the horizontal deflection plates 114 and one of the vertical deflection plates 116, respectively, of a cathode ray tube 112.

Returning now to computer unit 68, the $r$ signal output conductor thereof is coupled to the input terminal of an amplifier 118, the output signal of which is applied to the control grid 119 of tube 112. Also, the output signal $x$ of unit 68 is amplified by an amplifier 122, and applied through a diode 123 and resistor 124 to one plate of a capacitor 125, the other plate thereof being coupled to ground. A gaseous discharge tube, such as neon tube 126, is directly coupled across the plates of capacitor 125.

The junction between capacitor 125 and resistor 124 is connected to the other of the two horizontal deflection plates 114 while the remaining vertical deflection plate is coupled to the positive terminal of a battery 128, the negative terminal of which is grounded. Finally, the negative terminal of a battery 129 is connected to the cathode of tube 112, the positive terminal thereof being connected to ground.

In operation, oscillator 103 produces an output signal of approximately 18 kilocycles a second in frequency. Each of resonant circuits 98 and 102 are tuned by the variable capacitors therein to parallel resonance for the frequency of oscillator 103, the air gaps of heads 96 and 97 being removed from disks 94 and 95, respectively, during the tuning process. With this accomplished then maximum voltages will be applied to the grids of triodes 104 and 105 and the filtered output potential, as applied to the horizontal and vertical deflection plates, respectively, of the cathode ray tube, will be at a maximum value.

Now, each of horizontal and vertical disks 94 and 95 is divided into sixteen portions or segments, with each segment on one disk being paired with one segment on the other disk to thus provide sixteen segment pairs. Each of the segment pairs corresponds to the shape of a given bit of information to be presented visually on the screen 117 of tube 112, the information bits, in turn, corresponding to the values that the $d_1$, $d_2$, etc., through $d_8$ binary numbers may take as they appear on information channel 10. Each segment comprises an irregular contour produced by filing, buffing, etc., to thus present, upon passing, a variable contour to the pole faces of its respective pick-up head. In particular, the contour for each segment of disk 94 corresponds to the horizontal deflection component of the particular numeral, sign, letter, etc., that it is intended to represent while the contour of its corresponding segment pair along the periphery of disk 95 corresponds to the vertical component of the numeral, sign, letter, etc.

In operation, each contoured segment on disk 94, for example, in passing pick-up head 96, changes the reluctance between the pole faces thereof and accordingly changes the inductance of head 96 as it appears across capacitor 99. This change of head inductance acts to detune resonant circuit 98, the amount of detuning corresponding to the change of inductance which, in turn, corresponds to a function of the contour of disk 94 appearing at that instant. This detuning serves to decrease the effective voltage applied to the grid of triode 104 and hence changes the magnitude of its plate or output potential.

This plate output potential comprises a carrier frequency component having the same frequency as the output signal of oscillator 103 and a modulation component whose waveform corresponds to the contour of disk 94. The diode in the plate circuit of triode 104 along with filter circuit 108 serve to demodulate the output signal of triode 104 and hence reproduce in signal waveform the contour appearing on the edge of disk 94. This signal corresponds, as stated before, to the horizontal component of the information bits to be visually reproduced on the screen 117 of tube 112.

In the same manner, resonant circuit 102 is effected by the passage of the periphery of disk 95 past the pole faces of pick-up head 97 with the result that the plate voltage of triode 105, modulated at the frequency of oscillator 103, has its magnitude varied in accordance with the pattern on disk 95. This modulated signal is demodulated by circuit 109 and the associated diode to thus represent the vertical deflection component of the information bits.

As contemplated, motor 92 will continuously drive drum 90 and disks 94 and 95. Thus, during each revolution of the shaft, sixteen consecutive voltage patterns, corresponding to the sixteen sections on each of disks 94 and 95, will be applied to the vertical and horizontal deflection plates. If the electron beam within tube 112 were to be continuously active, then the sixteen consecutive numerals, letters, etc., would be consecutively presented on the screen 117. To prevent this, grid 119 is normally biased to an off or blanked condition such that, although the deflection pattern voltages are present, the electron beam produced by the cathode electrode does not strike the screen. Now, by properly gating grid 119 to an "on" condition during the time of travel of a specific segment pair as it passes the pole faces of the two pick-up heads, it is possible to visually reproduce the identification or image of the information bit represented by the binary number isolated in the L-register during the drum's revolution.

Specifically, whenever signal $r$ is at its low voltage level, grid 119 is biased to cut off and the electron beam emanating from the cathode is blanked and does not appear as a trace on screen 117. However, whenever signal $r$ goes to its high level, as it will for one segment appearance each revolution of shaft 91, grid 119 will become unblanked, that is, it will be raised to a sufficient positive value relative to the cathode to permit the electron beam to trace the particular deflection potentials placed on the deflection plates during that interval as a visual image on screen 117.

As will be appreciated, since the appearance of a high voltage level in signal $r$ is directly associated with a given $n$ mark as permanently recorded on track 76, it is necessary that a predetermined space relationship exist between each of such $n$ marks and its corresponding segment pair of disks 94 and 95. In order to more clearly set forth this relationship between each $n$ mark appearance in signal $n$ and the beginning of each of the contoured segments on disks 94 and 95, reference is now made to the below set forth Table I.

*Table 1*

| | | | | | | | | | |
|---|---|---|---|---|---|---|---|---|---|
| 1 | $cl$ | 1 | 2 | 3 | 4 | 5 | 6 | 7 | 8 |
| 2 | $n_2$ | 1 | 0 | 0 | 0 | 0 | 0 | 0 | 0 |
| 3 | $q$ | 0 | 1 | 1 | 1 | 1 | 1 | 0 | 0 |
| 4 | $t_1, t_2$ | 0 | 0 | 1 | 2 | 3 | 4 | 0 | 0 |
| 5 | $r$ | $r_1$ | $r_1$ | $r_1$ | $r_1$ | $r_1$ | $r_1$ | 0 | $r_3$ |

On line 1 of the table is found in eight consecutive columns, eight consecutively designated $cl$ timing intervals. On line 2 is found the symbol $n_2$ representing signal $n$ as it reproduces the value of the second $n$ mark following the $x$ mark. This second $n$ mark appears, as before described, for one timing interval, herein the first $cl$ interval, and has during that interval the binary value of one. Then, during the remaining seven $cl$ intervals, it has a zero value signifying that the second $n$ mark has passed and that the N flip-flop is again in its zeroed state. On the third line is found the signal $q$ values and, in accordance with the previous discussion, signal $q$ will be equal to one during the second timing interval, having been set equal thereto by the appearance of the one value in signal $n$ during the preceding interval.

Now, owing to signal $q$ being at its high voltage level at the beginning of the next or third interval, counter 84, comprising flip-flops $T_1$ and $T_2$ initiates its counting of the next four timing intervals as set forth in the fourth line of the table. Signal $q$ remains high during the counting of these four intervals at the end of which count, at the beginning of the seventh $cl$ interval, signal $q$ is switched low and the counter is returned, in the manner previously explained, back to a zero count.

It is during the seventh interval that the content of flip-flop K is examined to determine whether or not a carry digit has resulted from the previous subtraction operation and if such has occurred, output signal $r$ is to be set equal to its high level to thus unblank the cathode ray tube's grid. Thus, assuming this examining operation to be carried out during the seventh interval, it is apparent that the beginning of the eighth interval is the earliest that a determination may be obtained as to whether the grid is to be unblanked or not. Thus, since the eighth timing interval following the second $n$ mark appearance is the first one in which the grid may be unblanked corresponding to the results of the subtraction operation produced by this $n$ mark, it is at that point that the beginning of the second segment contour should be formed on disks 94 and 95 relative to the second $n$ mark recording on track 76. Thus, on the fifth line and the eighth $cl$ interval, $r_2$ is written in the table to thus denote that signal $r$ may at that time be switched high, if signal $k$ is high, to thus cause the second information bit to be visually reproduced on screen 117.

If flip-flop R should be switched high, it will not again be switched low until the counter flip-flops $T_1$ and $T_2$ are both at their high conduction levels, representing a count of 11, following the next or third $n$ mark appearance. Thus, the contour on disks 94 and 95 that began at the beginning of the eighth timing interval following this second $n$ mark appearance may continue on through the sixth timing interval following the next $n$ mark appearance.

The example thus given for the operation of the system following the second $n$ mark appearance is followed for each of the remaining sixteen $n$-mark appearances. In this way it is thus seen that the $r_1$ values given on line 5 for the first through the sixth $cl$ intervals represent that flip-flop R is either high or low in accordance with the results of the subtraction ordered previously by the first $n$ mark appearance. It may also be here noted that only a single timing interval need separate the end of one segment contour and the beginning of the next, which timing interval corresponds in Table I to the seventh $cl$ interval.

As will be appreciated, the separations between adjacent $n$ marks need not be the same around channel 76 since certain of the numerals, letters, etc., may require greater deflection disk contour lengths to accurately reproduce their characteristics on the tube screen. In fact, an extra wide spacing is required between the two $n$ marks preceding and following the $x$ mark since not only must time be given for the subtraction ordered by the final $n$ mark, but also for the circulation of the channel information through the stepping register as is done during passage of the eight space $x$ mark.

Accordingly, the first and last $n$ marks should be at least eight spaces further apart than is the absolute minimum required for the normal subtraction operation.

The consecutive $d_1$, $d_2$, $d_3$, . . . $d_8$ binary numbers recorded around information channel 10 may represent not only consecutive place digits of an answer number produced, for example, by a desk calculator, adding machine, or the like, but may also include a sign digit and a decimal point. Now, during, for example, a first revolution of the drum, the $d_1$ number will be isolated in the register and its corresponding visual representation presented on screen 117. Then, during successive revolutions, the $d_2$, $d_3$, etc., numbers will, in turn, likewise be presented as images on screen 117. In order that these consecutive presentations not fall one on top of the other, it is necessary to apply a stepping potential to the horizontal plates such that the digits will appear from right to left in the order of their appearance.

This is accomplished by applying signal $x$, which is produced only once each revolution, to an amplifier 122 and applying the output of amplifier 122 across capacitor 125. Now, resistor 124 in conjunction with capacitor 125 forms an integrating circuit and the charge across the capacitor increases a finite amount upon each signal $x$ appearance. The parameters of the circuit should be so adjusted that each signal $x$ appearance causes the horizontal deflection voltage to be raised such an amount that the next appearing binary number to be isolated in the register, may be traced on the next adjacent space on the screen.

At the end of each eight revolutions, corresponding to the eight binary numbers in the set, the charge on capacitor 125 will reach the point, assuming proper adjustment of the involved parameters, where neon tube 126 conducts to consequently discharge it. Then, the cycle begins upon the next $n$ mark appearance corresponding to the now isolated $D_1$ number. Also, the charge remaining on capacitor 125 after each discharge thereof by tube 126 should be so related to the average potential placed on the other horizontal plate by filter circuit 108 so as to cause the first representation corresponding to $d_1$ or $D_1$ to fall on the right portion of coating 117 as viewed by an observer. Then, the incremental charge changes on capacitor 125 should be such as to cause the remaining second, third . . . through eighth representations to fall in individual spaces to the left thereof, preferably with the eighth representation appearing on the left hand side of the tube's face.

Figure 7:
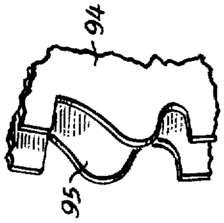
Fig. 7 is a perspective showing of a portion of a pair of deflection disks.

Referring now to Figure 7, there is illustrated one contour segment pair on deflection disks 94 and 95, the pair producing horizontal and vertical deflection potentials for the Arabic numeral "6." Briefly, such a contour may be obtained by dividing the "6" into equal lengthed segments and securing the two components at each division by appropriate projections. The contour here presented is greatly exaggerated with respect to the depth of cut relative to the length thereof, for the sake of clarity.

Figure 8:
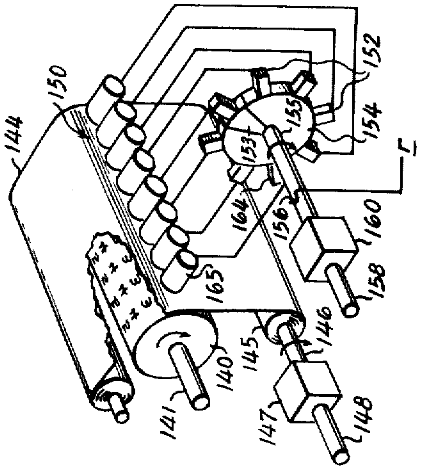
Fig. 8 is a high speed printer embodiment for use with the computer system of Fig. 6.

Referring now to Figure 8, there is illustrated an alternative read-out device for use with the computer unit illustrated in Figure 3, the device being adapted to print on paper the characters represented by the values of the first binary number set. In particular, the device includes a printing cylinder 140 affixed to one end of a shaft 141 driven by memory drum motor 92 of Figure 6, not herein again illustrated. Printing cylinder 140 contains sixteen rows of raised characters, the sixteen corresponding to the sixteen possible values that each binary number may take. Each row includes eight raised characters of identical configuration, the eight as viewed from left to right in Figure 8 corresponding to the eight binary numbers of the first and second number sets respectively.

A roll of printing paper 144 is slidingly disposed over a portion of cylinder 140 and is taken up at 145 by a take-up shaft 146, shaft 146 being driven through a gear and ratchet arrangement, generally indicated by block 147, by a shaft 148, in turn coupled to the drive shaft, not illustrated, of the memory drum. A horizontal row of eight electro-magnetically driven typing hammers, designated at 150, are disposed outside of paper 144 and upon energization make a short striking action on the paper to impress the cylinder characters on paper 144. As will be evident, an inked ribbon, not specifically illustrated, should be included between paper 144 and cylinder 140 in order that a printed impression may be obtained from each character when struck by the hammer.

These eight typing hammers are individually connected to eight brushes, respectively, designated at 152, disposed around the periphery of a disk 154, attached to one end of a shaft 155 of conductive material. In particular, the left hand hammer 165 is connected to one of the brushes designated 164 with the successive hammers to the right thereof being connected to the consecutive brushes positioned in a counter-clockwise direction from brush 164.

Disk 154 is formed of insulating material with the exception of a pie shaped segment 153, the outer edge of which extends for substantially one eighth of the periphery of the disk, segment 153 being of conductive material and adapted to successively engage the various brushes upon subsequent rotation of shaft 155. One end of a wire spring loop 156 makes a wiping conductive contact with shaft 155, the other end thereof being connected to the output signal *r* conductor of the computer unit, as illustrated in Figure 2. Shaft 156, is driven by shaft 158 through a speed reduction mechanism represented by block 160, shaft 158 being also driven by the magnetic drum motor.

In operation, cylinder 140 is driven synchronously with the memory drum and the sixteen rows of characters thereon correspond exactly to the sixteen counter segments on the deflection disks of Figure 6. Now, mechanism 147 contains a gearing and ratchet mechanism which rotates shaft 146 an amount corresponding to one printed line for every eighth revolution of shaft 148. Although this mechanism is not specifically illustrated, as will be understood by those skilled in the art, a large variety of known mechanisms could be employed to accomplish this stated result. Thus, for each eight revolutions of the memory drum, corresponding to the isolation and identification of the eight consecutive numbers of either the "*d*" or "D" number sets on the information channel, printing sheet 144 will remain stationary and hence allow, as will be soon seen, a single row of characters to be printed.

Speed reduction mechanism 160 provides a speed reduction of eight to one for shaft 158 driven, as before stated, synchronously with the memory drum. Hence, shaft 155 will make one revolution for each eight revolutions of the memory drum. Now, by having brushes 152 disposed at substantially equal intervals around disk 154, conductive segment 153 will successively engage the brushes, each engagement being for one revolution of the memory.

The relative angular displacement between shaft 155 and the memory drums should be such that when segment 153 is in conductive contact with brush 164, for example, the $d_1$ binary number is isolated in the register and identified, the identification being represented by the appearance of output signal *r* at its high voltage level. This high voltage level will be produced for an interval of time corresponding to the passage of one of the rows of raised characters on cylinder 140 past the series of typing hammers and will be conducted from spring loop 156, through conductive shaft 155, through conductive segment 153, through brush 164, and, finally, to typing hammer 165. Hammer 165 will be actuated by this high voltage level and will, in turn, cause the raised character on cylinder 140 appearing at that instant beneath it to be impressed on the underside of paper 144.

Then, during the next revolution of the memory corresponding to the isolation of the $d_2$ digit, segment 153 will be in contact with the next adjacent brush in the clockwise direction from brush 164, and when signal *r* again goes high, corresponding to the $d_2$ value, another character will be printed on the same line as previously, by the hammer to the right of hammer 165. This operation continues through the printing of the $d_8$ binary number representation by the electro-magnetic hammer on the extreme right, after which, mechanism 147 will actuate its output shaft 146 and roll 145 will be rotated such that a new line of paper 144 will be presented to the line of hammers 150 and hence be available for the printing of the next row of characters corresponding to the $D_1$ through $D_8$ numbers of the second number set. In utilizing a printing mechanism of this type in an actual computer application, it is anticipated that the computer's operation will be such that, after each of the eight memory drum revolutions, a new series of binary number values will be entered on the information channel which, in turn, will be later printed in the manner explained.

The computer read-out system as specifically illustrated in Figure 6, along with its alternative read-out portion as found in Figure 8, is not intended to be exhaustive of the various forms that the information arrangement therein as well as its components may take. For example, the memory may take the form of any cyclical storage medium, such as an endless magnetic tape, an electrostatic storage drum, or various storage tubes as utilized and known in the prior art. In the same way, the flip-flops may be constructed of transistors or magnetic switches and, additionally, appropriate relay switching circuits may be substituted for the flip-flops if the speed of their operation permits. In the same manner, the diode gating circuits herein specifically illustrated may be replaced by other types of gating devices using for example, vacuum tubes, transistors, and the like.

Also, only two number sets on the information channel were described as being utilized with the relationship between them, the length of the memory channel, etc., being set forth. If, for example, three number sets were interplexed with each other, then substantially one-third of the memory track would be utilized between the "read" and "write" heads thereof with each drum revolution successively bringing forth to the entrance of the stepping register, the consecutive numbers of one of the binary number sets. Also, the number of digits in each of the binary number sets is not intended to be limited to four as is herein specifically illustrated. For example, one, two, three, five, six digits, etc., may well be used as the binary number length. In any event, the number of stages of the stepping register should equal the number of digits in each binary number.

Furthermore, the number of successive subtractions performed on the isolated number during each drum revolution will also be determined by the length of the number isolated. For example, four successive subtractions would be required to establish the value of a two digit number, eight for a three digit number, thirty-two for a five digit number, etc. The number of subtractions required may be most conveniently expressed mathematically by $2^n$, where $n$ is the number of digits in each binary number.

As will also be apparent, the identification of each binary number value through successive subtractions and continuous examination of the resulting carry digits may be performed in other ways. For example, continuous single additions or subtractions may be performed on the number and when a predetermined value is attained in the register, such as 0000 or 1111, such fact may be communicated to flip-flop R by an appropriate "and" gating circuit connected to the proper output terminals of the L-register flip-flops.

What is claimed is:

1. In combination: a stepping register; a cyclical storage device having binary information recirculating therethrough; first means for selectively removing portions of said information from said storage device to said stepping register to isolate the portions of said binary information therein; and second means for identifying each of the portions of isolated information, said second means including apparatus for successively altering each of the portions of isolated information.

2. The combination of claim 1 wherein said second means is coupled to said stepping register for producing a visual image representing the value of the isolated information.

3. A computer system comprising: a rotatable magnetic memory drum having an information track thereon; "read" and "write" heads positioned adjacent said information track for reading and writing information thereon, respectively to store a predetermined quantity of information on said track; a register circuit for storing only a portion of said information; and electronic switching means coupled to said drum and operable in synchronism therewith, for selectively routing the information read by said "read" head either through said register circuit to said "write" head or directly to said "write"

head whereby in the latter instance a portion of said information is isolated in said register circuit.

4. A computer system comprising: a cyclical storage device having a plurality of binary numbers recorded around an information track thereon; first means for recirculating said plurality of binary numbers on said track, said first means including a read transducer for reading information from said track, a write transducer for writing information on said track, and apparatus for applying to said write transducer information read by said read transducer; second means, including a static storage register, said second means being conductively coupled to said first means for successively storing only alternate binary numbers of said plurality of numbers in said static storage register upon the recirculation thereof; and third means coupled to said second means for identifying each number isolated by said second means.

5. A computer system for selectively isolating the consecutive values of a first set of binary numbers found interplexed with a second set of binary numbers, each binary number in both sets having a predetermined number of digits, said system comprising: a stepping register having a plurality of stages equal in number to the number of digits in each binary number; a rotatable magnetic memory drum; "read" and "write" heads positioned adjacent an information channel of said drum, the digits of all except one number of said first and second binary number sets appearing as magnetic states on the information channel between said "read" and "write" heads, the digits of the remaining number appearing in said stepping register, said "read" and "write" heads being spaced by less than 180° from each other around said channel an amount corresponding to the number of magnetic states required for recording one of the binary numbers; and selectively actuable means for routing the binary numbers read by said "read" head either through said stepping register to said "write" head or directly to said "write" head whereby in the latter case a binary number is isolated in said stepping register.

6. The computer system according to claim 5 including, in addition, means for actuating said selectively actuable means during consecutive drum revolutions such that the consecutive binary numbers of said first set are successively isolated in the register, each for substantially one drum revolution, and means for determining the value of each first set binary number during the time it appears isolated in the register.

7. The computer system according to claim 6 wherein the last-named means includes in addition, means for performing a series of changes in binary one valued steps of the value of each isolated number until the original value thereof reappears, and means responsive to the change step producing a predetermined number in the register for producing an output signal, the appearance of said output signal relative to the number of change steps performed determining the value of the isolated number.

8. The computer system according to claim 7 including, in addition, a normally blanked cathode ray tube having vertical and horizontal deflection plates and a screen, means for continuously applying a series of electrical deflection patterns to said vertical and horizontal plates corresponding to the series of characters, respectively, representing the series of values each binary number may take, the series of deflection patterns corresponding, in turn, to the series of step changes, respectively, performed on the value of each isolated binary number, and means responsive to the appearance of said output signal for unblanking said cathode ray tube whereby the deflection patterns being applied at that time to said deflection plates produces a corresponding visual image on said screen representing the determined value of the isolated binary number.

9. The computer system according to claim 8 including, in addition, means for applying a cyclical stepping potential to one of said horizontal plates, the number of steps in said stepping potential being equal to the number of numbers in said first set whereby the visual image representing the value of each isolated binary number is produced on a separate portion of said screen.

10. The computer system according to claim 9 including, in addition, a printing cylinder having a series of raised characters thereon, said series of characters corresponding to the series of values, respectively, each binary number may take, print receiving means positioned adjacent said printing cylinder, striking means responsive to an input signal for pressing said print receiving means against a character on said printing cylinder, means for rotating said printing cylinder such that the series of characters pass said striking means during said series of value changes, respectively, in the isolated binary number, and means for applying said output signal to said striking means whereby a printed image is obtained of the isolated binary number.

11. The computer system according to claim 9 including, in addition, a printing cylinder having a series of rows of raised characters thereon, each row having a plurality of identical characters equal in number to the number of binary numbers in said first set, said series of character rows corresponding to the series of values, respectively, each binary number may take, print receiving means positioned adjacent said printing cylinder, a plurality of striking means, one for each binary number of said first set, each of said striking means being responsive to an input signal for pressing said print receiving means against a character on said printing cylinder, means for rotating said printing cylinder such that the series of character rows completely pass said plurality of striking means during said series of value changes, respectively, produced in each isolated binary number, and means for applying the output signal produced for each isolated number to its corresponding striking means whereby consecutive printed images are produced for the consecutive binary numbers in said first set.

12. The computer system according to claim 6 wherein the last-named means includes means for successively subtracting a plurality of binary one values from each isolated number, said plurality of subtractions being such as to leave the value of the binary number at its original value, and means responsive to the number of subtractions producing a predetermined remainder for producing an output signal denoting the value of the isolated number.

13. A device for indicating the value of a binary number contained in a short memory, said device comprising: means for successively changing in binary one steps the value of the number in the memory until the original value thereof reappears; means responsive to a predetermined value of the number in the memory for producing an output signal, and means responsive to the appearance of said output signal relative to the number of binary one step changes made in the number for indicating the original value thereof.

14. The device of claim 15 wherein the last-named means includes, in addition, normally inoperative means for producing successive visual images corresponding to the successive binary one change steps of the number in the register, and means responsive to said output signal for operating said normally inoperative means.

15. A device for indicating the value of a binary number, said device comprising: a series of first electronic switches whose conduction states represent the values of the series of place digits of the binary number; a second electronic switch whose initial conduction state represents a binary one value; first actuable means for simultaneously subtracting the binary value represented by said second electronic switch from the binary value represented by the least significant digit electronic switch of said series of switches, placing the result and carry digits of the subtraction in the most significant digit switch of said series of first switches and said second the switch containing the next smaller significant place digit, except the least one, in said series of switches to the switch containing the next dollar significant place digit; second actuable means for actuating said first actuable means until the number of subtractions performed equal the number of place digits in said binary number; means for actuating said second actuable means a number of times until the original value of the binary number again appears in said series of switches; and means responsive to a carry digit of one remaining in said second electronic switching means at the conclusion of one of the operations of said first actuable means for producing an output signal.

16. The device of claim 15 including, in addition, means operable in response to said output signal for visually producing an image represented by the value of the binary number.

17. In combination: a stepping register having a plurality of stages; a first cyclical memory device for recirculating a plurality of binary numbers thereon, each of the said binary numbers having a number of binary digits equal to the number of stages in said stepping register, said first memory device including write means for reading binary numbers in said first device, read means for reading recorded numbers, and apparatus for coupling said read means to said write means; a second cyclical memory device synchronously connected to said first device for producing periodic mark signals and means responsive to each of said mark signals for selectively storing a given one of said plurality of binary numbers in said stepping register.

18. The combination of claim 17 including, in addition, means for visually representing the value of the binary number isolated in the stepping register.

19. In combination: a cyclical storage device having binary information recirculating therethrough, said device including write means for recording applied binary information therein, read means for reading recorded information, and apparatus for reapplying information read to said write means; static storage means for storing binary information; and means, including a cyclically operable element operable in synchronism with said storage device, for selectively removing predetermined portions of said binary information from said storage device and storing said predetermined portions of said recirculating binary information in said static storage means.

20. In combination: first means for storing a single binary number; second means for recirculating a plurality of binary numbers; third means including a cyclically operable element, operable in synchronism with said second means for successively storing alternate binary numbers of said plurality of binary numbers in the first-named means, each of the storages being for a predetermined interval of time; and fourth means for indicating the value of each binary number stored in said first-named means during the time of its storage therein.

21. In combination: a rotating memory drum; means for recirculating binary information around a fractional part of the surface of said drum; static storage means; means for isolating a predetermined portion of the recirculating binary information in said static storage means for a single revolution of said memory drum; and means for identifying the binary information isolated in said static storage means during the single revolution of said memory drum, said last named means including apparatus for performing successive mathematical operations, during a single revolution of the drum, upon the binary information isolated in said static storage means.

22. In combination: means for storing a binary number having an initial value; means for altering the value of the stored binary number in successive binary one valued steps until the initial value reappears; and means responsive to the particular binary one valued step alteration producing a predetermined value of the stored binary number for indicating the initial value of the stored binary number.

23. In combination: a memory drum; means for rotating said memory drum; means for recirculating a series of binary numbers around a portion of said drum, each of said binary numbers having one of a plurality of possible values; register means; means for selectively isolating one of the recirculating binary numbers in said register means for one revolution of said memory drum; means for successively changing the value of the isolated binary number in one valued binary step, a plurality of times corresponding to said plurality of possible values during said one memory drum revolution whereby the initial value of said isolated number reappears; means responsive to the particular one of said plurality of one valued binary step changes of the isolated number leaving a predetermined value thereof for producing an output signal; and readout means including a rotatable member having a plurality of character producing segments corresponding to the plurality of binary one valued changes, means for rotating said rotatable member synchronously with said memory drum, means responsive to an input signal for producing a visual character image of the character producing segment on said rotatable member passing a predetermined point at that time, and means for applying said output signal to the last-named means.

24. In combination: a memory drum; rotatable means having a plurality of character producing segments spaced around its periphery; means for driving said memory drum and said rotatable means in synchronism; actuable means associated with a point on the periphery of said rotatable means for producing, when actuated, a visual image corresponding to the character producing segment passing thereby; means for recirculating all but one of a plurality of binary numbers around one-half of the circumference of said memory drum less the length needed to store said one binary number, each of said binary numbers having a value corresponding to one of the character producing segments around said rotatable means; static storage means for storing said one binary number; means responsive to the passage of each of said character producing segments for changing the value of the one binary number in said static storage means a binary value of one; and means responsive to a predetermined value of one binary number remaining in said static storage means after a binary one valued change thereof for actuating said actuable means whereby a visual image is produced corresponding to said one binary number.

25. In combination: a memory drum; means for rotating said memory drum; means for recirculating a series of binary numbers around said drum, each of said numbers having one of a plurality of possible values, said series of binary numbers recirculating substantially an integral number of times during each single rotation of said drum; means for successively isolating selected binary numbers of said series of recirculating binary numbers, each of said isolations being for one revolution of said drum; means rotatable with said drum and having a plurality of successive character producing segments corresponding to the plurality of possible values each of said isolated binary numbers may take; means responsive during the isolation of each of said selected binary numbers for determining its value and producing an output signal corresponding to a character producing segment on the last-named means; and means responsive to each of said output signals and its corresponding character producing segment for producing a visual image of said character producing segment.

26. A recirculating memory system comprising: cyclically operable number storage means for normally recirculating a plurality of stored binary numbers; register means for storing one of said binary numbers; cyclically operable signal production means synchronously connected to said storage means for periodically producing a predetermined mark signal, the cycle of operation of said signal production means exceeding the cycle of operation of said storage means; and read-record means, responsive to said mark signals for reading only one of said binary numbers into said register means during each cycle of operation of said signal production means and simultaneously transferring into said storage means the binary number read into said register means during the previous cycle of operation of said signal production means.

27. The memory system defined by claim 26 wherein said storage means includes apparatus for serially recirculating said stored binary numbers, each number comprising a plurality of serial binary digits; said register means including a binary stepping register, and said read-record means including apparatus responsive to said mark signals for serially reading the digits of only one of said numbers into said stepping register during each cycle of operation of said signal production means and simultaneously serially transferring into said storage means the digits of the number read into said stepping register during the previous cycle of operation of said signal production means.

28. A recirculating memory system comprising: cyclically operable number storage means for normally recirculating a plurality of stored binary numbers; a stepping register for storing one of said binary numbers; cyclically operable signal production means synchronously connected to said storage means for periodically producing a predetermined mark signal, the cycle of operation of said signal production means being different from the cycle of operation of said storage means; and read-record means responsive to each of said mark signals for selectively reading only one of said plurality of numbers into said stepping register and simultaneously recording in said storage means the number previously read into said register.

29. In an apparatus for isolating and displaying successive numbers stored in a recirculating memory system, the combination comprising: a cyclically operable number storage device including a "read" terminal, a "write" terminal, first means responsive to number signals applied to said "write" terminal for applying each of the number signals to said "read" terminal after a predetermined time delay T, and second means connected to said "read" terminal for applying each number signal received at said "read" terminal to said "write" terminal; signal production means synchronously operable with respect to said storage device for producing periodic mark signals having a predetermined period $t$ different from T; a stepping register for storing a group of the number signals; and switching means responsive to each mark signal for inhibiting the operation of said second means, said switching means being additionally responsive to each mark signal for applying signals appearing at said "read" terminal to said stepping register and simultaneously stepping out signals previously stored in said register to said "write" terminal, whereby at each appearance of said mark signal a different group of number signals are temporarily isolated within said stepping register.

30. The combination defined by claim 29 wherein said time delay $T=a.\Delta t$ and said period $t=b.\Delta t$ where $\Delta t$ is a predetermined unit time interval and $a$ and $b$ are integers, the integer $a$ being equal to the quantity $$\frac{b}{2}-1$$

31. The combination defined by claim 29 wherein said time delay $T=a.\Delta t$ and said period $t=b.\Delta t$, $\Delta t$ being a predetermined unit time interval and $a$ and $b$ being integers having entirely different prime factors.

32. In an apparatus for isolating successive numbers stored in a recirculating memory system, the combination comprising: cyclically operable number storage means for normally recirculating a plurality of stored binary numbers, said number storage means having a predetermined first cycle of operation; a stepping register for storing one of said numbers; first control means synchronously coupled to said storage means and having a predetermined second cycle of operation different from said first cycle, for selectively removing one of said numbers from said storage means to said stepping register during each of said second cycles of operation and simultaneously reinserting in said storage means the number read into said register during the previous one of said second cycles of operation.

33. The combination defined by claim 32 which further includes second control means synchronously coupled to said storage means and having a third cycle of operation whose duration is integrally related to the duration of said first cycle of operation, said second control means being coupled to said stepping register for performing during each of said third cycles of operation a mathematical operation upon the number stored therein.

34. In an electronic computing system, the combination comprising: a cyclically operable recirculating memory channel having a predetermined cycle of operation of duration T for storing a plurality of number groups of binary signals, said recirculating memory channel including a "write" terminal, and delay means for normally receiving each binary signal applied to said "write" terminal and reapplying the signal to said "write" terminal after a predetermined time delay equal to T; a stepping register having an additional number group of binary signals stored therein; and apparatus coupled to said "write" terminal, said delay means and said stepping register for serially interchanging each signal of only a selected one of said plurality of number groups with a corresponding signal of said additional number group, whereby the selected number group is interchanged with said additional number group without altering the duration T of said predetermined cycle of operation of said recirculating memory channel.

35. A computer system comprising: a rotatable magnetic memory drum including an information track having a plurality of binary numbers recirculating therethrough; a stepping register for storing one of said binary numbers; first means for selectively removing one of said binary numbers from said information track and reading said number into said stepping register; second means for indicating the value of each number stored in said stepping register, said second means including apparatus for successively performing one of the operations of addition and subtraction upon the stored number; and third means for returning each of the stored numbers from said stepping register to said information channel.

References Cited in the file of this patent

UNITED STATES PATENTS

| | | |
|---|---|---|
| 2,202,392 | May et al. | May 28, 1940 |
| 2,533,242 | Gridley | Dec. 12, 1950 |
| 2,540,654 | Cohen et al. | Feb. 6, 1951 |
| 2,594,731 | Connolly | Apr. 29, 1952 |
| 2,596,741 | Tyler et al. | May 13, 1952 |
| 2,701,095 | Stibitz | Feb. 1, 1955 |
| 2,770,797 | Hamilton | Nov. 13, 1956 |

OTHER REFERENCES

Publication I, Math. Tables and Aids to Computation, Nat. Research Council, January 1950, pages 31–39 (Div. 42).

Publication II, Electronics, January 1951, pp. 108–111. The Computation Lab., Harvard Univ., Progress Report #2, Fig. 3, page 11–8 (Div. 23).

Publication #3 ("Magnetic Delay Line Storage," I. E. E. Proceedings, April 1951 (Div. 42).